US012627398B2

(12) United States Patent
Zhang et al.

(10) Patent No.: US 12,627,398 B2
(45) Date of Patent: May 12, 2026

(54) FULL-DUPLEX CELL INDICATION FOR FULL-DUPLEX OPERATION

(71) Applicant: QUALCOMM Incorporated, San Diego, CA (US)

(72) Inventors: Qian Zhang, Basking Ridge, NJ (US); Navid Abedini, Basking Ridge, NJ (US); Yan Zhou, San Diego, CA (US); Kapil Gulati, Belle Mead, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/482,792

(22) Filed: Sep. 23, 2021

(65) Prior Publication Data

US 2023/0091873 A1     Mar. 23, 2023

(51) Int. Cl.
| | |
|---|---|
| *H04L 1/00* | (2006.01) |
| *H04L 5/14* | (2006.01) |
| *H04W 72/1263* | (2023.01) |
| *H04W 72/20* | (2023.01) |
| *H04W 76/10* | (2018.01) |

(52) U.S. Cl.
CPC .............. *H04L 1/0025* (2013.01); *H04L 5/14* (2013.01); *H04W 72/1263* (2013.01); *H04W 72/20* (2023.01); *H04W 76/10* (2018.02)

(58) Field of Classification Search
CPC ........ H04L 1/0025; H04L 5/14; H04W 76/10; H04W 72/20; H04W 72/1263
USPC ......................................... 370/310, 328, 329
See application file for complete search history.

(56) References Cited

U.S. PATENT DOCUMENTS

| | | | |
|---|---|---|---|
| 10,484,838 | B2 | 11/2019 | Kim et al. |
| 11,252,229 | B2 * | 2/2022 | Kim ...................... H04W 76/14 |
| 2004/0057407 | A1 | 3/2004 | Balachandran et al. |

(Continued)

FOREIGN PATENT DOCUMENTS

| | | |
|---|---|---|
| EP | 1920626 A1 | 5/2008 |
| EP | 2595339 A2 | 5/2013 |

(Continued)

OTHER PUBLICATIONS

International Search Report and Written Opinion—PCT/US2022/041111—ISA/EPO—Dec. 5, 2022.

*Primary Examiner* — Obaidul Huq
(74) *Attorney, Agent, or Firm* — Holland & Hart LLP

(57) ABSTRACT

Methods, systems, and devices for wireless communications are described. In one aspect, a base station may transmit an indication of a communications mode capability associated with establishing a connection with the base station, and a user equipment (UE) may establish a connection with the base station if the UE has the communications mode capability. In this aspect, the base station may bar UEs that lack the communications mode capability from establishing a connection with the base station such that the base station may avoid configuring or scheduling communications differently for devices with different capabilities. In another aspect, a base station may transmit an indication of whether the base station operates in a full-duplex mode, a half-duplex mode, or both, and a UE may establish a connection with the base station based on whether the base station operates in the full-duplex mode, the half-duplex mode, or both.

30 Claims, 18 Drawing Sheets

(56) References Cited

U.S. PATENT DOCUMENTS

| | | |
|---|---|---|
| 2006/0153101 A1 | 7/2006 | Raisanen |
| 2007/0060182 A1 | 3/2007 | Chen et al. |
| 2007/0066333 A1 | 3/2007 | Chen et al. |
| 2008/0175169 A1 | 7/2008 | Deb et al. |
| 2009/0092066 A1 | 4/2009 | Chindapol et al. |
| 2009/0092067 A1 | 4/2009 | Sudarshan et al. |
| 2009/0219841 A1 | 9/2009 | Sudarshan et al. |
| 2009/0257406 A1 | 10/2009 | Sankar et al. |
| 2009/0268641 A1 | 10/2009 | Yim et al. |
| 2009/0268645 A1 | 10/2009 | Chindapol et al. |
| 2010/0290375 A1 | 11/2010 | Chin et al. |
| 2011/0128942 A1 | 6/2011 | Kim et al. |
| 2013/0039297 A1 | 2/2013 | Wang |
| 2013/0250818 A1* | 9/2013 | Gaal ..................... H04W 56/00 |
| | | 370/350 |
| 2014/0146696 A1* | 5/2014 | Lin ....................... H04L 5/0094 |
| | | 370/252 |
| 2014/0293843 A1* | 10/2014 | Papasakellariou .... H04L 5/0037 |
| | | 370/280 |
| 2014/0348040 A1 | 11/2014 | Hong et al. |
| 2015/0195097 A1 | 7/2015 | Grigsby et al. |
| 2015/0333871 A1 | 11/2015 | Lin et al. |
| 2016/0380746 A1* | 12/2016 | Min .................... H04L 43/0888 |
| | | 370/277 |
| 2017/0070994 A1* | 3/2017 | Rico Alvarino ...... H04L 5/0007 |
| 2017/0273091 A1 | 9/2017 | Noh et al. |
| 2017/0302341 A1 | 10/2017 | Yu et al. |
| 2017/0303096 A1 | 10/2017 | Masuda et al. |
| 2018/0007724 A1* | 1/2018 | Kazmi .................. H04W 8/005 |
| 2018/0092089 A1 | 3/2018 | Yin et al. |
| 2019/0037385 A1* | 1/2019 | Li ..................... H04W 36/0033 |
| 2019/0052320 A1 | 2/2019 | Yu et al. |
| 2019/0199412 A1 | 6/2019 | Koskela et al. |
| 2019/0289536 A1 | 9/2019 | Tao et al. |
| 2020/0163005 A1 | 5/2020 | Rao et al. |
| 2020/0266908 A1 | 8/2020 | Qian et al. |
| 2020/0404646 A1 | 12/2020 | Zhang et al. |
| 2021/0203469 A1 | 7/2021 | Abedini et al. |
| 2022/0385439 A1 | 12/2022 | Qian et al. |
| 2023/0090758 A1 | 3/2023 | Zhang et al. |
| 2023/0300906 A1* | 9/2023 | Shin ..................... H04W 76/10 |
| | | 370/277 |
| 2024/0049216 A1 | 2/2024 | He et al. |
| 2024/0049229 A1 | 2/2024 | He et al. |
| 2024/0049243 A1 | 2/2024 | He et al. |
| 2024/0106607 A1 | 3/2024 | Prasad et al. |

FOREIGN PATENT DOCUMENTS

| | | |
|---|---|---|
| EP | 3737137 A1 | 11/2020 |
| WO | WO-2007020292 A1 | 2/2007 |
| WO | WO-2017111821 A1 | 6/2017 |
| WO | WO-2019170149 A1 | 9/2019 |

* cited by examiner

105

Full duplex
communications

Full duplex
communications

115

115

500

115-b 105-b

Communications mode capability

705

Operating mode

710

Establish connection

715

Configurations

720

Control information

725

Communications over established connection

730

700

Communications Mode
Capability Manager

1425

Connection Manager

1430

Operating Mode Manager

1435

Configuration Manager

1440

Control Information Manager

1445

1420

1400

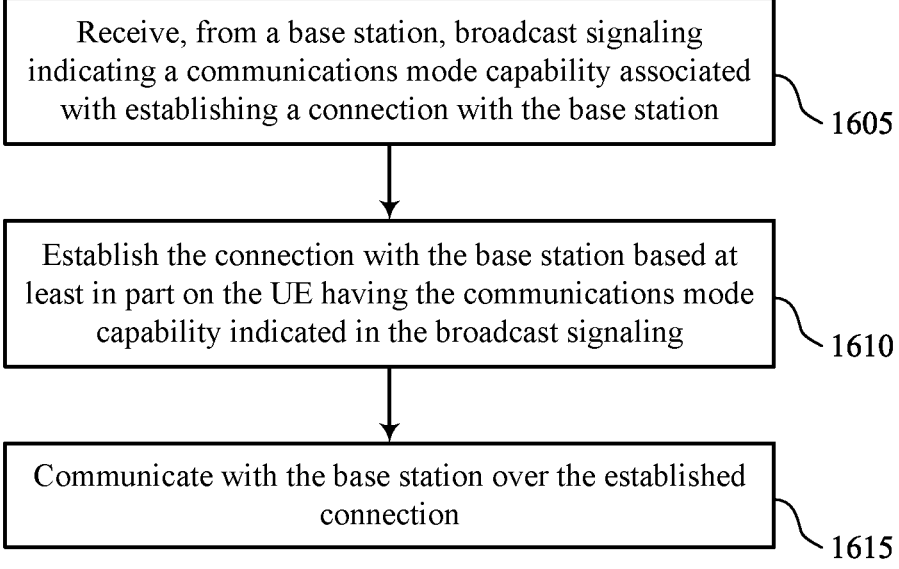

Receive, from a base station, broadcast signaling indicating a communications mode capability associated with establishing a connection with the base station

1605

Establish the connection with the base station based at least in part on the UE having the communications mode capability indicated in the broadcast signaling

1610

Communicate with the base station over the established connection

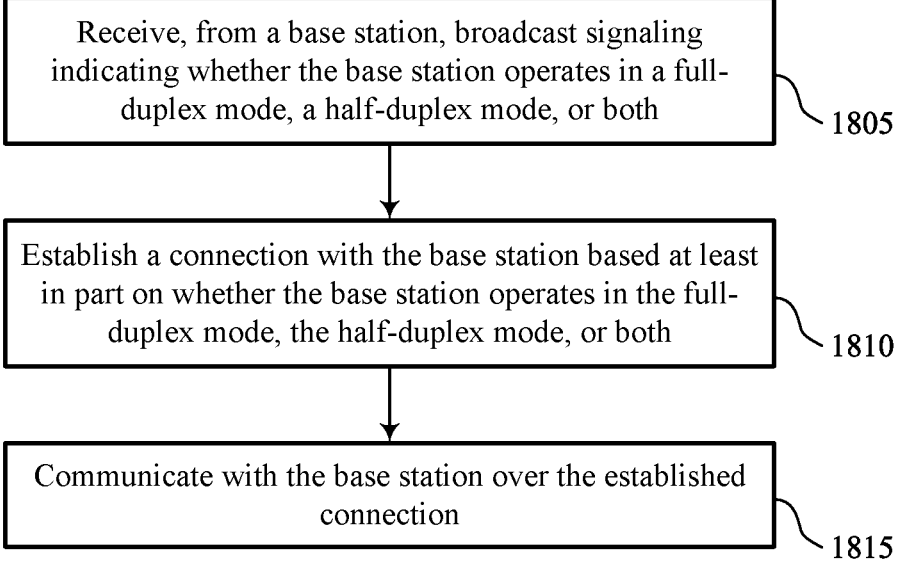

Receive, from a base station, broadcast signaling indicating whether the base station operates in a full-duplex mode, a half-duplex mode, or both

1805

Establish a connection with the base station based at least in part on whether the base station operates in the full-duplex mode, the half-duplex mode, or both

1810

Communicate with the base station over the established connection

FULL-DUPLEX CELL INDICATION FOR FULL-DUPLEX OPERATION

FIELD OF TECHNOLOGY

The following relates to wireless communications, including full-duplex cell indication for full-duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support full-duplex communications, half-duplex communications, or both between a base station and a UE. Improved techniques for facilitating full-duplex communications or half-duplex communications between base stations and UEs in a wireless communications system may be desirable.

SUMMARY

The described techniques relate to improved methods, systems, devices, and apparatuses that support full-duplex cell indication for full-duplex operation. In one aspect, a base station may transmit an indication of a communications mode capability associated with establishing a connection with the base station, and a user equipment (UE) may establish a connection with the base station if the UE has the communications mode capability. In this aspect, the base station may bar UEs that lack the communications mode capability from establishing a connection with the base station such that the base station may avoid configuring or scheduling communications differently for devices with different capabilities. In another aspect, a base station may transmit an indication of whether the base station operates in a full-duplex mode, a half-duplex mode, or both, and a UE may establish a connection with the base station based on whether the base station operates in the full-duplex mode, the half-duplex mode, or both.

A method for wireless communication at a UE is described. The method may include receiving, from a base station, broadcast signaling indicating a communications mode capability associated with establishing a connection with the base station, establishing the connection with the base station based on the UE having the communications mode capability indicated in the broadcast signaling, and communicating with the base station over the established connection.

An apparatus for wireless communication at a UE is described. The apparatus may include a processor, memory coupled with the processor, and instructions stored in the memory. The instructions may be executable by the processor to cause the apparatus to receive, from a base station, broadcast signaling indicating a communications mode capability associated with establishing a connection with the base station, establish the connection with the base station based on the UE having the communications mode capability indicated in the broadcast signaling, and communicate with the base station over the established connection.

Another apparatus for wireless communication at a UE is described. The apparatus may include means for receiving, from a base station, broadcast signaling indicating a communications mode capability associated with establishing a connection with the base station, means for establishing the connection with the base station based on the UE having the communications mode capability indicated in the broadcast signaling, and means for communicating with the base station over the established connection.

A non-transitory computer-readable medium storing code for wireless communication at a UE is described. The code may include instructions executable by a processor to receive, from a base station, broadcast signaling indicating a communications mode capability associated with establishing a connection with the base station, establish the connection with the base station based on the UE having the communications mode capability indicated in the broadcast signaling, and communicate with the base station over the established connection.

Some examples of the method, apparatuses, and non-transitory computer-readable medium described herein may further include operations, features, means, or instructions for identifying a default communications mode capability associated with establishing the connection with the base station in absence of the broadcast signaling indicating the communications mode capability. In some examples of the method, apparatuses, and non-transitory computer-readable medium described herein, the default communications mode capability includes a half-duplex capability.

In some examples of the method, apparatuses, and non-transitory computer-readable medium described herein, the communications mode capability includes a full-duplex capability and the method, apparatuses, and non-transitory computer-readable medium may include further operations, features, means, or instructions for determining that the UE may have the full-duplex capability, where establishing the connection with the base station may be based on the UE having the full-duplex capability.

Some examples of the method, apparatuses, and non-transitory computer-readable medium described herein may further include operations, features, means, or instructions for receiving, from the base station, signaling indicating cell-specific configurations for communications with the base station based on the communications mode capability.

Some examples of the method, apparatuses, and non-transitory computer-readable medium described herein may further include operations, features, means, or instructions for receiving, from the base station, one or more of semi-persistent scheduling information, control information, or random-access parameters based on the communications mode capability. In some examples of the method, apparatuses, and non-transitory computer-readable medium described herein, the broadcast signaling includes system information. In some examples of the method, apparatuses, and non-transitory computer-readable medium described herein, the broadcast signaling includes a single bit indicator.

A method for wireless communication at a base station is described. The method may include transmitting broadcast signaling indicating a communications mode capability associated with establishing a connection with the base station, establishing the connection with a UE based on the UE having the communications mode capability indicated in the broadcast signaling, and communicating with the UE over the established connection.

An apparatus for wireless communication at a base station is described. The apparatus may include a processor, memory coupled with the processor, and instructions stored in the memory. The instructions may be executable by the processor to cause the apparatus to transmit broadcast signaling indicating a communications mode capability associated with establishing a connection with the base station, establish the connection with a UE based on the UE having the communications mode capability indicated in the broadcast signaling, and communicate with the UE over the established connection.

Another apparatus for wireless communication at a base station is described. The apparatus may include means for transmitting broadcast signaling indicating a communications mode capability associated with establishing a connection with the base station, means for establishing the connection with a UE based on the UE having the communications mode capability indicated in the broadcast signaling, and means for communicating with the UE over the established connection.

A non-transitory computer-readable medium storing code for wireless communication at a base station is described. The code may include instructions executable by a processor to transmit broadcast signaling indicating a communications mode capability associated with establishing a connection with the base station, establish the connection with a UE based on the UE having the communications mode capability indicated in the broadcast signaling, and communicate with the UE over the established connection.

In some examples of the method, apparatuses, and non-transitory computer-readable medium described herein, the communications mode capability includes a full-duplex capability, and the UE may have the full-duplex capability. Some examples of the method, apparatuses, and non-transitory computer-readable medium described herein may further include operations, features, means, or instructions for transmitting signaling indicating cell-specific configurations for communications with the base station based on the communications mode capability.

Some examples of the method, apparatuses, and non-transitory computer-readable medium described herein may further include operations, features, means, or instructions for transmitting one or more of semi-persistent scheduling information, control information, or random-access parameters based on the communications mode capability. In some examples of the method, apparatuses, and non-transitory computer-readable medium described herein, the broadcast signaling includes system information. In some examples of the method, apparatuses, and non-transitory computer-readable medium described herein, the broadcast signaling includes a single bit indicator.

In some examples of the method, apparatuses, and non-transitory computer-readable medium described herein, the base station may be configured with a default communications mode capability associated with establishing the connection with the base station in absence of the broadcast signaling indicating the communications mode capability. In some examples of the method, apparatuses, and non-transitory computer-readable medium described herein, the default communications mode capability includes a half-duplex capability.

A method for wireless communication at a UE is described. The method may include receiving, from a base station, broadcast signaling indicating whether the base station operates in a full-duplex mode, a half-duplex mode, or both, establishing a connection with the base station based on whether the base station operates in the full-duplex mode, the half-duplex mode, or both, and communicating with the base station over the established connection.

An apparatus for wireless communication at a UE is described. The apparatus may include a processor, memory coupled with the processor, and instructions stored in the memory. The instructions may be executable by the processor to cause the apparatus to receive, from a base station, broadcast signaling indicating whether the base station operates in a full-duplex mode, a half-duplex mode, or both, establish a connection with the base station based on whether the base station operates in the full-duplex mode, the half-duplex mode, or both, and communicate with the base station over the established connection.

Another apparatus for wireless communication at a UE is described. The apparatus may include means for receiving, from a base station, broadcast signaling indicating whether the base station operates in a full-duplex mode, a half-duplex mode, or both, means for establishing a connection with the base station based on whether the base station operates in the full-duplex mode, the half-duplex mode, or both, and means for communicating with the base station over the established connection.

A non-transitory computer-readable medium storing code for wireless communication at a UE is described. The code may include instructions executable by a processor to receive, from a base station, broadcast signaling indicating whether the base station operates in a full-duplex mode, a half-duplex mode, or both, establish a connection with the base station based on whether the base station operates in the full-duplex mode, the half-duplex mode, or both, and communicate with the base station over the established connection.

Some examples of the method, apparatuses, and non-transitory computer-readable medium described herein may further include operations, features, means, or instructions for selecting the base station with which to establish the connection based on whether the base station operates in the full-duplex mode, the half-duplex mode, or both. In some examples of the method, apparatuses, and non-transitory computer-readable medium described herein, the broadcast signaling includes system information. In some examples of the method, apparatuses, and non-transitory computer-readable medium described herein, the broadcast signaling includes a single bit indicator.

A method for wireless communication at a base station is described. The method may include transmitting broadcast signaling indicating whether the base station operates in a full-duplex mode, a half-duplex mode, or both, establishing a connection with a UE based on transmitting the broadcast signaling indicating whether the base station operates in the full-duplex mode, the half-duplex mode, or both, and communicating with the UE over the established connection.

An apparatus for wireless communication at a base station is described. The apparatus may include a processor, memory coupled with the processor, and instructions stored in the memory. The instructions may be executable by the processor to cause the apparatus to transmit broadcast signaling indicating whether the base station operates in a full-duplex mode, a half-duplex mode, or both, establish a connection with a UE based on transmitting the broadcast signaling indicating whether the base station operates in the full-duplex mode, the half-duplex mode, or both, and communicate with the UE over the established connection.

Another apparatus for wireless communication at a base station is described. The apparatus may include means for transmitting broadcast signaling indicating whether the base station operates in a full-duplex mode, a half-duplex mode, or both, means for establishing a connection with a UE based on transmitting the broadcast signaling indicating whether the base station operates in the full-duplex mode, the half-duplex mode, or both, and means for communicating with the UE over the established connection.

A non-transitory computer-readable medium storing code for wireless communication at a base station is described. The code may include instructions executable by a processor to transmit broadcast signaling indicating whether the base station operates in a full-duplex mode, a half-duplex mode, or both, establish a connection with a UE based on transmitting the broadcast signaling indicating whether the base station operates in the full-duplex mode, the half-duplex mode, or both, and communicate with the UE over the established connection.

In some examples of the method, apparatuses, and non-transitory computer-readable medium described herein, the broadcast signaling includes system information. In some examples of the method, apparatuses, and non-transitory computer-readable medium described herein, the broadcast signaling includes a single bit indicator.

BRIEF DESCRIPTION OF THE DRAWINGS

FIGS. 16 through 18 show flowcharts illustrating methods that support full-duplex cell indication for full-duplex operation in accordance with aspects of the present disclosure.

DETAILED DESCRIPTION

Figure 1:
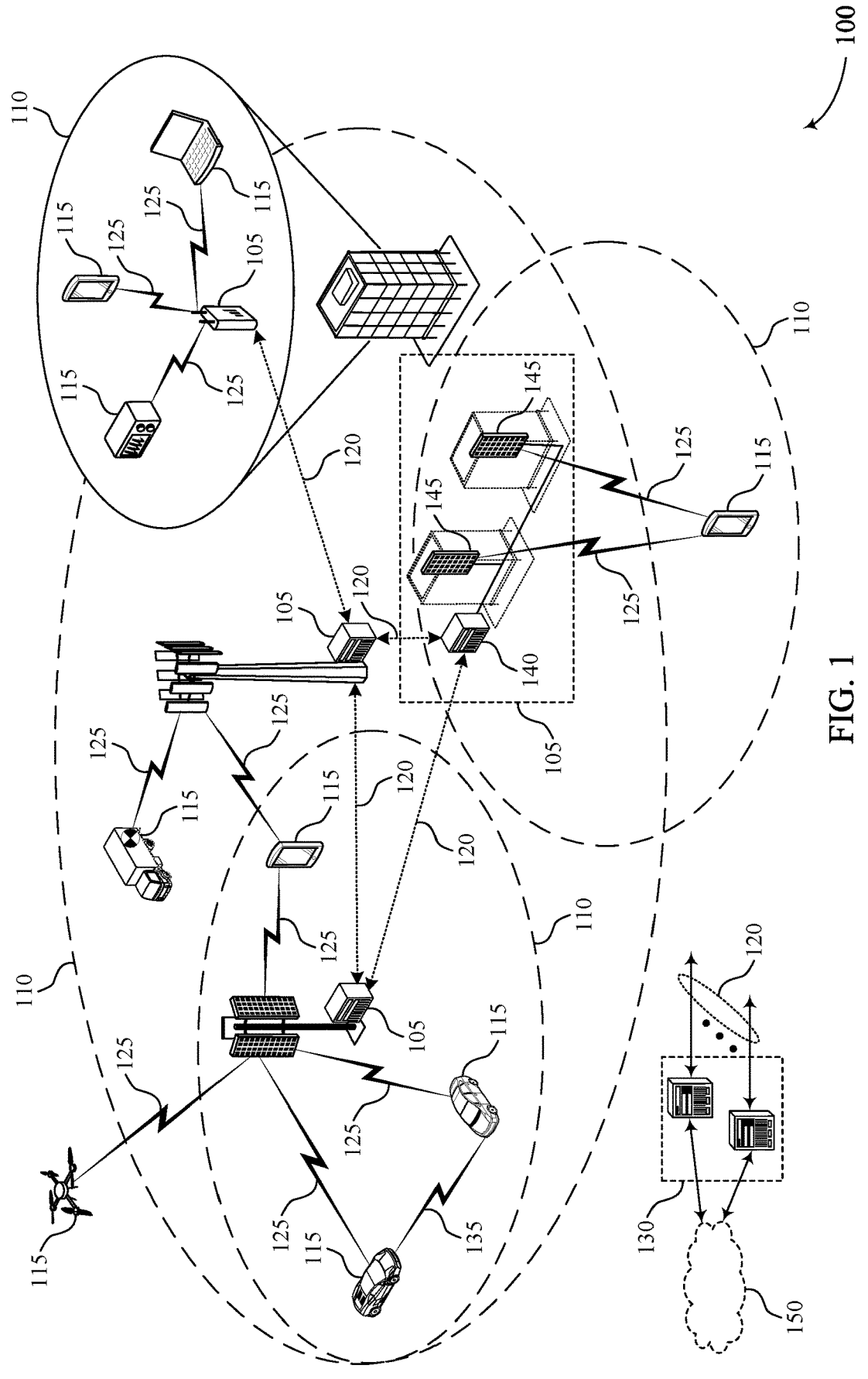
FIG. 1 illustrates an example of a wireless communications system that supports full-duplex cell indication for full-duplex operation in accordance with aspects of the present disclosure.

Some wireless communications systems may support full-duplex communications, half-duplex communications, or both between a base station and a user equipment (UE). In such systems, different base stations may support different operating modes including a full-duplex mode for full-duplex communications or a half-duplex mode for half-duplex communications. In addition, different UEs may have different capabilities, where a UE with full-duplex capabilities may operate in the full-duplex mode for full-duplex communications, and a UE with half-duplex capabilities may operate in the half-duplex mode for half-duplex communications.

In some cases, although base stations and UEs may both support different operating modes, a UE may not be able to detect a mode in which a base station is operating. As such, in one aspect, UEs with different capabilities may connect to the base station regardless of the mode in which the base station is operating. In this aspect, the base station may configure or schedule communications differently for UEs with different capabilities, resulting in an increase in overhead and complexity at the base station and the UEs. In another aspect, a UE may not be able to perform cell selection based on an operating mode of a base station, which may lead to reduced throughput since the UE may miss out on additional resources or transmission opportunities (e.g., if the UE selects a half-duplex cell instead of a full-duplex cell).

As described herein, a wireless communications system may support efficient techniques for facilitating full-duplex communications and half-duplex communications with minimal overhead and complexity.

In one aspect, a base station may transmit an indication of a communications mode capability associated with establishing a connection with the base station, and a UE may establish a connection with the base station if the UE has the communications mode capability. In this aspect, the base station may bar UEs that lack the communications mode capability from establishing a connection with the base station such that the base station may avoid configuring or scheduling communications differently for devices with different capabilities.

In another aspect, a base station may transmit an indication of whether the base station operates in a full-duplex mode, a half-duplex mode, or both, and a UE may establish a connection with the base station based on whether the base station operates in the full-duplex mode, the half-duplex mode, or both. In this aspect, the UE may perform cell selection based on the operating mode of the base station, resulting in improved throughput if the UE is able to get access to additional resources or transmission opportunities for communications.

Aspects of the disclosure are initially described in the context of wireless communications systems. Examples of processes and signaling exchanges that support full-duplex cell indication for full-duplex operation are then described. Aspects of the disclosure are further illustrated by and described with reference to apparatus diagrams, system diagrams, and flowcharts that relate to full-duplex cell indication for full-duplex operation.

FIG. 1 illustrates an example of a wireless communications system 100 that supports full-duplex cell indication for full-duplex operation in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

In addition to, or as an alternative to, a half-duplex mode, some UEs 115 may support a full-duplex mode. A full-duplex mode may refer to a mode that supports two-way communication via simultaneous transmission and reception. This two-way communication may be referred to as full-duplex communications. Full-duplex communications is an emerging technique which is capable of theoretically doubling link capacity by enabling radio network nodes to transmit and receive simultaneously on the same frequency and time resource. Full-duplex breaks half-duplex operation constraints where transmission and reception either differ in time or in frequency. A full-duplex network node, such as a base station 105 or UE 115 in the cellular network, can communicate simultaneously in uplink and downlink with two half-duplex panels using the same radio resources. For instance, a UE 115 may transmit uplink transmissions from one panel at the UE 115, and the UE 115 may receive downlink transmissions at another panel at the UE 115. Similarly, a base station 105 may receive uplink transmissions at one panel at the base station 105, and the base station 105 may transmit downlink transmissions from another panel at the base station 105.

Thus, a device equipped with multiple TRPs that owns the capability of simultaneous transmission and reception using the same time-frequency radio resource may be referred to as a full-duplex capable device (e.g., full-duplex UE 115 or full-duplex base station 105). The device may also be capable of working in both the full-duplex mode and backing off to a half-duplex mode. In some cases, a full-duplex capability may be conditional on beam separation and other factors (e.g., self-interference between downlink and uplink and a clutter echo at a device). However, full-duplex communications may provide for latency reduction (e.g., since it may be possible to receive a downlink signal in an uplink-only slot, which may enable latency savings), spectrum efficiency enhancement (e.g., per cell or per UE 115), and more efficient resource utilization.

Figure 2:
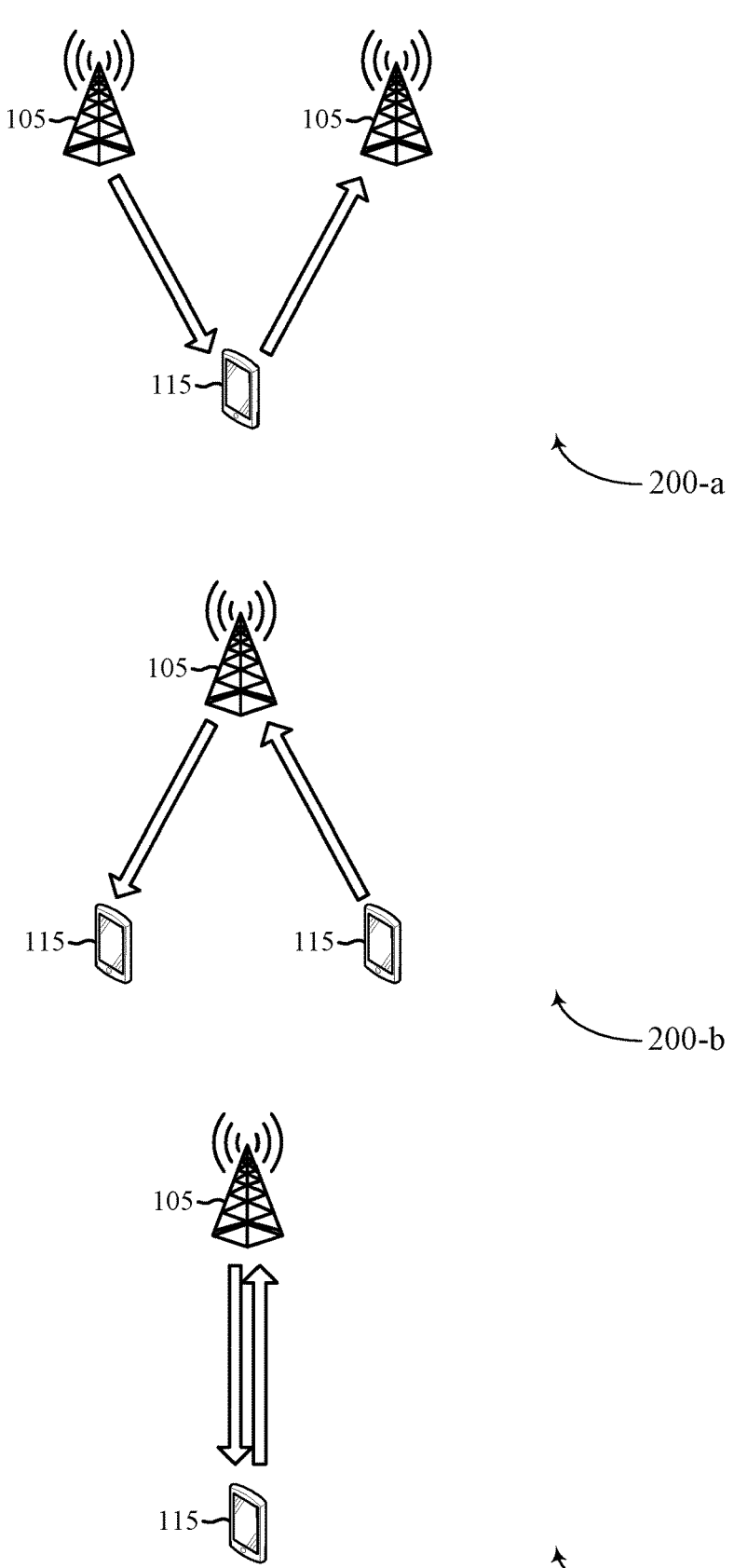
FIG. 2 illustrates an example of full-duplex communications in accordance with aspects of the present disclosure.

FIG. 2 illustrates an example of full-duplex communications 200 in accordance with aspects of the present disclosure. In a first example 200-a, a UE 115 may support full-duplex communications (e.g., operate in a full-duplex mode), and the UE 115 may receive downlink signals from a first base station 105 (e.g., cell or transmission and reception point (TRP)) and transmit uplink signals to a second base station 105. The first example 200-a may be an example of multi-TRP communications. In a second example 200-b, a base station 105 may support full-duplex communications (e.g., operate in a full-duplex mode), and the base station 105 may transmit downlink signals to a first UE 115 and receive uplink signals from a second UE 115. In a third example 200-*c*, a base station 105 and a UE 115 may each support full-duplex communications (e.g., operate in a full-duplex mode). The base station 105 may transmit downlink signals to the UE 115 and receive uplink signals from the UE 115, and the UE 115 may receive downlink signals from the base station 105 and transmit uplink signals to the base station 105.

Figure 3:
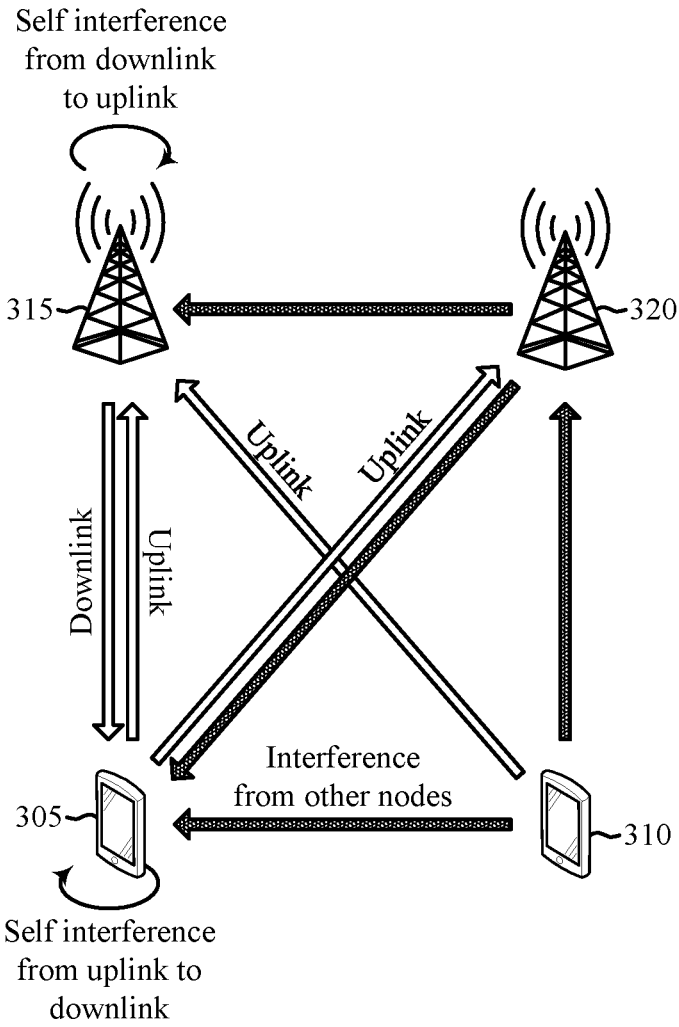
FIG. 3 illustrates an example of a network in accordance with aspects of the present disclosure.

FIG. 3 illustrates an example of a network 300 in accordance with aspects of the present disclosure. The network 300 may include a first UE 305, a second UE 310, a first base station 315, and a second base station 320. The first UE 305 and the second UE 310 may be examples of UEs 115 described herein, and the first base station 315 and the second base station 320 may be examples of base stations 105 described herein.

The first UE 305 may support full-duplex communications with the first base station 315 and half-duplex communications with the second base station 320. In particular, the first UE 305 may receive downlink signals from the first base station 315 and transmit uplink signals to the first base station 315, and the first UE 305 may transmit uplink signals to the second base station 320. In some cases, the first UE 305 may be referred to as a full-duplex UE 305. In addition, the second UE 310 may support half-duplex communications with the first base station 315. In particular, the second UE 310 may transmit uplink signals to the first base station 315. In some cases, the second UE 310 may be referred to as a half-duplex UE 310.

The first base station 315 may support full-duplex communications with the first UE 305 and half-duplex communications with the second UE 310. In particular, the first base station 315 may transmit downlink signals to the first UE 305 and receive uplink signals from the first UE 305, and the first base station 315 may receive uplink signals from the second UE 310. In some cases, the first base station 315 may be referred to as a full-duplex base station 315. In addition, the second base station 320 may support half-duplex communications with the first UE 305. In particular, the second base station 320 may receive uplink signals from the first UE 305. In some cases, the second base station 320 may be referred to as a half-duplex base station 320.

In some cases, communications between some base stations 105 and UEs 115 in the network 300 may interfere with communications between other base stations 105 and UEs 115 in the network. That is, there may be interference 325 between nodes in the network 300. For instance, communications at the second base station 320 may interfere with communications at the first base station 315 and communications at the first UE 305. Similarly, communications at the second UE 310 may interfere with communications at the first UE 305 and communications at the second base station 320. In addition, because the first base station 315 and the first UE 305 may support full-duplex communications, each of these devices may experience self-interference (e.g., from uplink to downlink). In some examples, self-interference may occur due to signal leakage between a transmit antenna and a receive antenna at a device.

As illustrated in FIG. 3, different base stations 105 in wireless communications system 100 may support different operating modes including a full-duplex mode for full-duplex communications or a half-duplex mode for half-duplex communications. In addition, different UEs 115 may have different capabilities, where a UE 115 with full-duplex capabilities may operate in the full-duplex mode for full-duplex communications, and a UE 115 with half-duplex capabilities may operate in the half-duplex mode for half-duplex communications.

In some cases, although base stations 105 and UEs 115 may both support different operating modes, a UE 115 may not be able to detect a mode in which a base station 105 is operating. As such, in one aspect, UEs 115 with different capabilities may connect to the base station 105 regardless of the mode in which the base station 105 is operating. In this aspect, the base station 105 may configure or schedule communications differently for UEs 115 with different capabilities, resulting in an increase in overhead and complexity at the base station 105 and the UEs 115. In another aspect, a UE 115 may not be able to perform cell selection based on an operating mode of a base station, which may lead to reduced throughput since the UE 115 may miss out on additional resources or transmission opportunities (e.g., if the UE 115 selects a half-duplex cell instead of a full-duplex cell).

The wireless communications system 100 may support efficient techniques for facilitating full-duplex communications and half-duplex communications with minimal overhead and complexity.

Figure 4:
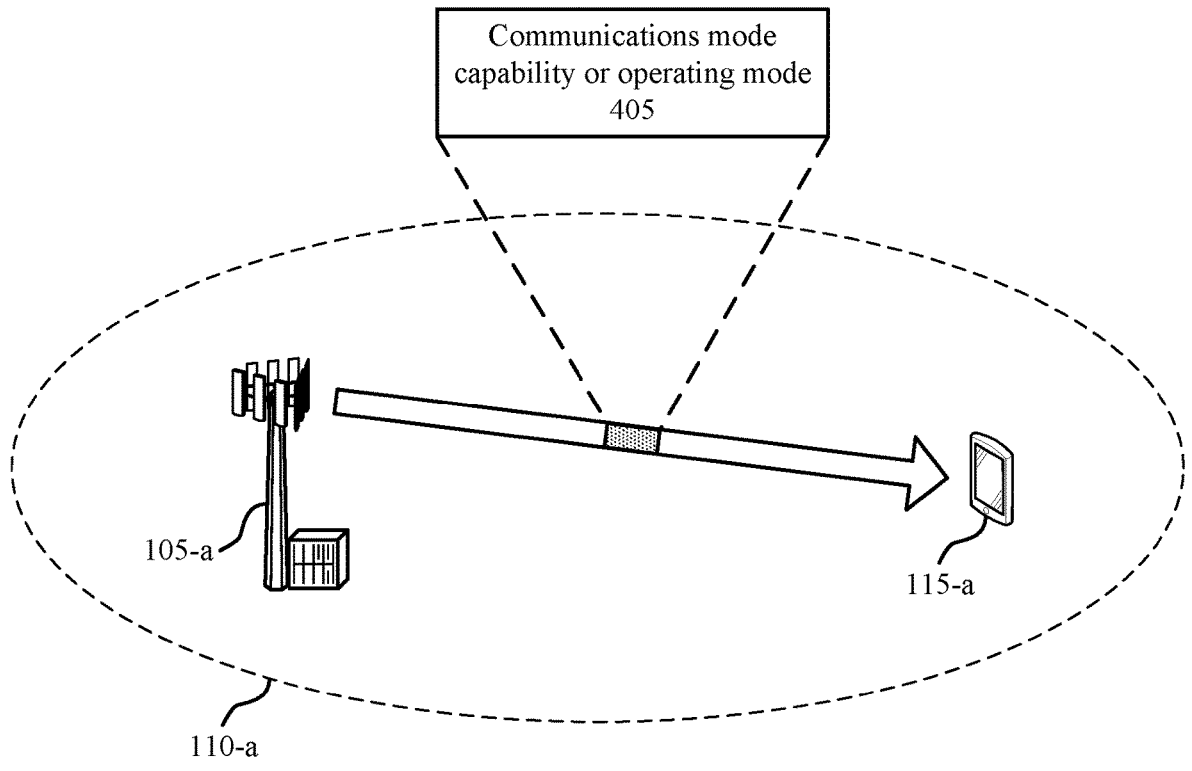
FIG. 4 illustrates an example of a wireless communications system that supports full-duplex cell indication for full-duplex operation in accordance with aspects of the present disclosure.

FIG. 4 illustrates an example of a wireless communications system 400 that supports full-duplex cell indication for full-duplex operation in accordance with aspects of the present disclosure. The wireless communications system 400 includes a UE 115-*a*, which may be an example of a UE 115 described with reference to FIGS. 1-3. The wireless communications system 400 also includes a base station 105-*a*, which may be an example of a base station 105 described with reference to FIGS. 1-3. The wireless communications system 400 may implement aspects of the wireless communications system 100. For example, the wireless communications system 400 may support efficient techniques for facilitating full-duplex communications and half-duplex communications with minimal overhead and complexity.

In one aspect, the base station 105-*a* may transmit an indication 405 of a communications mode capability associated with establishing a connection with the base station 105-*a*, and the UE 115-*a* may establish a connection with the base station 105-*a* if the UE 115-*a* has the communications mode capability. In some cases, the base station 105-*a* may transmit the indication 405 of the communications mode capability in broadcast signaling (e.g., system information or a system information block 1 (SIB1)). For instance, the broadcast signaling may include one bit to indicate whether the base station 105-*a* (e.g., a cell) is a full-duplex base station 105, a half-duplex base station 105, or a combined base station 105.

In this aspect, the full-duplex base station 105 may refer to a base station 105 with which only UEs 115 having a full-duplex capability may connect, the half-duplex base station 105 may refer to a base station 105 with which only UEs 115 having a half-duplex capability may connect, and the combined base station 105 may refer to a base station 105 with which any UE 115 may connect. In some cases, one of the cell types (e.g., full-duplex, half-duplex, or combined) may be defined (e.g., predefined, preconfigured, etc.) as default. For example, if the base station 105-*a* fails to indicate the communications mode capability 405 (e.g., no such indication bit is included in broadcast signaling), the base station 105-*a* may be a half-duplex base station 105 by default (e.g., with no requirement for connecting UEs 115 to have a full-duplex capability).

If the base station 105-*a* transmits the indication 405 of the communications mode capability, the base station 105-*a* may bar UEs 115 that lack the communications mode capability from establishing a connection with the base station 105-*a*. For instance, if the additional bit in the broadcast signaling indicates that the base station 105-*a* is a full-duplex base station 105, then UEs 115 connected to the base station 105-*a* may be required to have full-duplex capability. Thus, with this indication (e.g., after receiving the indication of the communications mode capability 405), the UE 115-*a* may decide based on its full-duplex capability on whether to select the base station 105-*a* or not and which base station 105 (e.g., serving cell) to select or connect to for initial access.

Because the base station 105-*a* may bar UEs 115 that lack the communications mode capability 405 from establishing a connection with the base station 105-*a*, the base station 105-*a* may avoid configuring or scheduling communications differently for UEs 115 with different capabilities (e.g., full-duplex capability and half-duplex capability). For instance, for a pure full-duplex base station 105, all cell-specific configurations may be broadcast to all UEs 115 since all UEs 115 have a full-duplex capability. Similarly, for semi-persistent scheduling (SPS) or configured grants, control information, or random-access channel (RACH) parameters, the base station 105-*a* may signal one, full-duplex set of parameters to save signaling overhead. As a result, the wireless communications system 400 may experience improved efficiency and high throughput (e.g., for communications with the base station 105-*a*).

Figure 5:
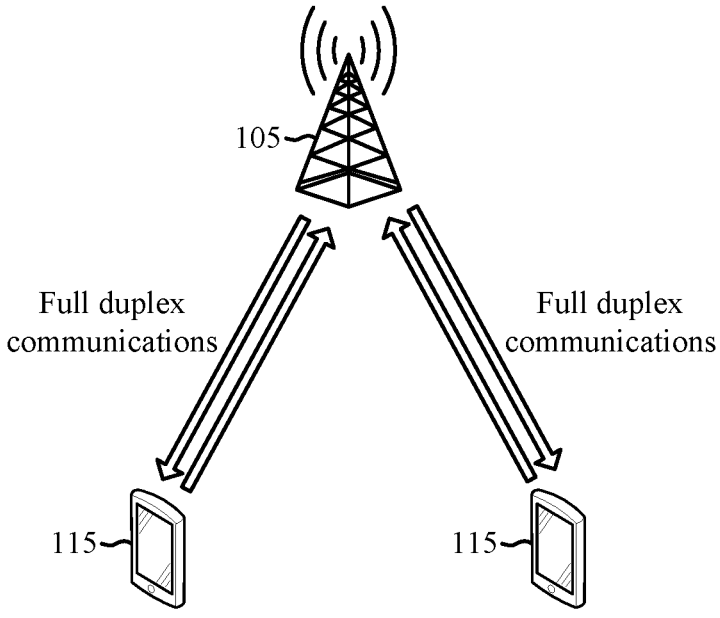
FIG. 5 illustrates an example of full-duplex communications between a base station and user equipment (UEs) in accordance with aspects of the present disclosure.

FIG. 5 illustrates an example of full-duplex communications 500 between a base station 105 and UEs 115 in accordance with aspects of the present disclosure. In FIG. 5, the base station 105 may communicate exclusively with UEs 115 having full-duplex capabilities and other UEs 115 may be barred from connecting to the base station 105.

In another aspect, the base station 105-*a* may transmit an indication 405 of an operating mode of the base station 105-*a*. The operating mode may be a full-duplex mode, a half-duplex mode, or both, and the UE 115-*a* may establish a connection with the base station 105-*a* based on whether the base station 105-*a* operates in the full-duplex mode, the half-duplex mode, or both. In some cases, the base station 105-*a* may transmit the indication 405 of the operating mode in broadcast signaling (e.g., system information or a system information block 1 (SIB1)). For instance, the broadcast signaling may include one bit to indicate whether the base station 105-*a* (e.g., a cell) is a full-duplex base station 105 (e.g., or a half-duplex base station 105). In this aspect, the full-duplex base station 105 may refer to a base station 105 operating in a full-duplex mode for full-duplex communications, and a half-duplex base station 105 may refer to a base station 105 operating in a half-duplex mode for half-duplex communications.

Thus, with this indication 405 (e.g., after receiving the indication 405 of the of the operating mode of the base station 105-*a*), the UE 115-*a* may be able to determine whether the base station 105-*a* (e.g., a serving cell) is a full-duplex base station 105 or a half-duplex base station 105. As such, the UE 115-*a* may perform cell selection based on the operating mode of the base station 105-*a*. For instance, with the full-duplex base station indication 405, the UE 115-*a* may have a choice for serving cell selection. As a result, the UE 115-*a* may experience improved throughput if the UE 115-*a* is able to get access to additional resources or transmission opportunities for communications based on performing cell selection based on the operating mode of the base station 105-*a* (e.g., the UE 115-*a* may achieve more transmission opportunities which results in more UE or cell throughput in a full-duplex base station cell).

Figure 6:
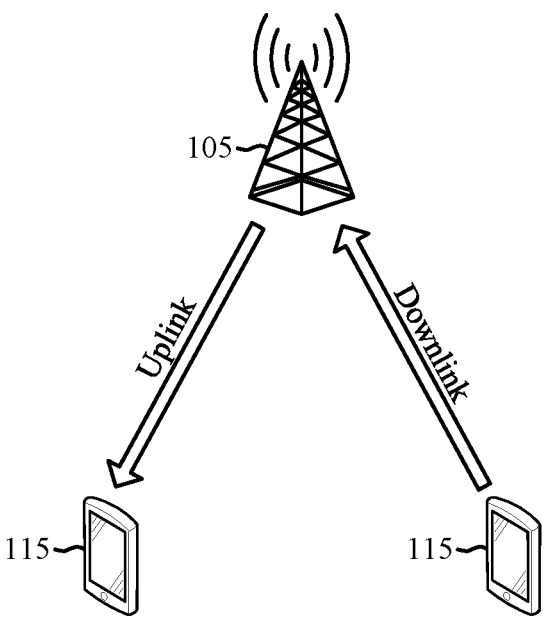
FIG. 6 illustrates an example of full-duplex communications at a base station in accordance with aspects of the present disclosure.

FIG. 6 illustrates an example of full-duplex communications 600 at a base station 105 in accordance with aspects of the present disclosure. In FIG. 6, the base station 105 may support full-duplex communications with UEs 115, and the UEs 115 may select or connect to the base station 105 based on the base station 105 supporting full-duplex communications.

Figure 7:
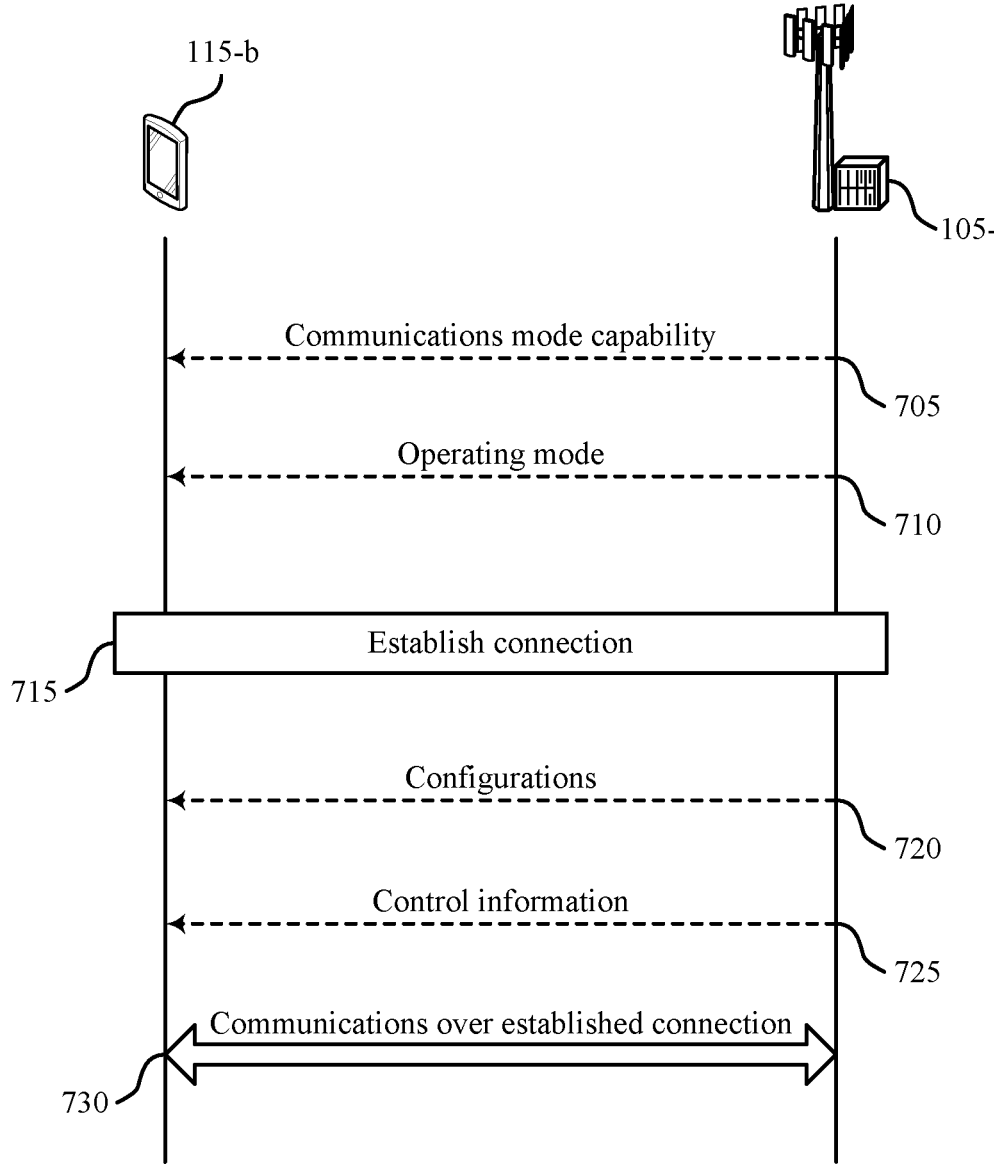
FIG. 7 illustrates an example of a process flow that supports full-duplex cell indication for full-duplex operation in accordance with aspects of the present disclosure.

FIG. 7 illustrates an example of a process flow 700 that supports full-duplex cell indication for full-duplex operation in accordance with aspects of the present disclosure. Process flow 700 includes a UE 115-*b*, which may be an example of a UE 115 described with reference to FIGS. 1-6. Process flow 700 also includes a base station 105-*b*, which may be an example of a base station 105 described with reference to FIGS. 1-6. The process flow 700 may implement aspects of wireless communications system 400. For example, the process flow 700 may support efficient techniques for facilitating full-duplex communications and half-duplex communications with minimal overhead and complexity.

In the following description of the process flow 700, the signaling exchanged between UE 115-*b* and base station 105-*b* may be exchanged in a different order than the example order shown, or the operations performed by UE 115-*b* and base station 105-*b* may be performed in different orders or at different times. Some operations may also be omitted from the process flow 700, and other operations may be added to the process flow 700.

At 705, the base station 105-*b* may transmit, and the UE 115-*b* may receive, an indication of a communications mode capability associated with establishing a connection with the base station 105-*b*. Additionally, or alternatively, at 710, the base station 105-*b* may transmit, and the UE 115-*b* may receive an indication of whether the base station 105-*b* operates in a full-duplex mode, a half-duplex mode, or both. The indication of whether the base station 105-*b* operates in the full-duplex mode, the half-duplex mode, or both may be referred to as an indication of an operating mode of the base station 105-*b*.

The base station 105-*b* may transmit, and the UE 115-*b* may receive, the indication of the communications mode capability, the indication of the operating mode, or both in broadcast signaling (e.g., system information). In some cases (e.g., in an absence of the indication of the communications mode capability), the UE 115-*b* may identify a default communications mode capability (e.g., a half-duplex capability) associated with establishing the connection with the base station 105-*b*. In some cases, the communications mode capability is a full-duplex capability, and the UE 115-*b* may determine that the UE 115-*b* has the full-duplex capability.

At 715, the UE 115-*b* may establish the connection with the base station 105-*b* based on the UE 115-*b* having the communications mode capability indicated by the base station 105-*b*. That is, the UE 115-*b* may determine a communications mode capability of the UE 115-*b*, and the UE 115-*b* may establish the connection with the base station 105-*b* based on the communications mode capability of the UE 115-*b*. For instance, if the communications mode capability is a full-duplex capability, and the UE 115-*b* determines that the UE 115-*b* has the full-duplex capability, the UE 115-*b* may establish the connection with the base station 105-*b*. Additionally, or alternatively, the UE 115-*b* may establish the connection with the base station 105-*b* based on whether the base station operates in the full-duplex mode, the half-duplex mode, or both.

In some cases, the UE 115-*b* may select the base station 105-*b* with which to establish the connection based on whether the base station operates in the full-duplex mode, the half-duplex mode, or both. For instance, even though measurements performed on reference signals received from another base station 105 may be better than measurements performed on reference signals received from the base station 105-*b* (e.g., a higher reference signal received power (RSRP)), the UE 115-*b* may choose to connect to the base station 105-*b* if the base station 105-*b* operates in the full-duplex mode (e.g., and the other base station 105 operates in the half-duplex mode).

At 720, the base station 105-*b* may transmit, and the UE 115-*b* may receive, signaling indicating cell-specific configurations for communications with the base station 105-*b* based on the communications mode capability indicated at 705. At 725, the base station 105-*b* may transmit, and the UE 115-*b* may receive, one or more SPS information, control information, or random-access parameters based on the communications mode capability indicated at 705. For instance, because the base station 105-*b* may exclusively connect to UEs 115 operating in a full-duplex mode (e.g., by barring other UEs 115 from connecting to the base station 105-*b* using the indication of the communications mode capability at 705), the base station 105-*b* may avoid indicating different configurations or control information for UEs 115 operating in different modes. That is, the base station 105-*b* may provide configurations and control information for those UEs 115 having the indicated communications mode capability.

At 730, the UE 115-*b* may communicate with the base station 105-*b* over the established connection.

Figure 8:
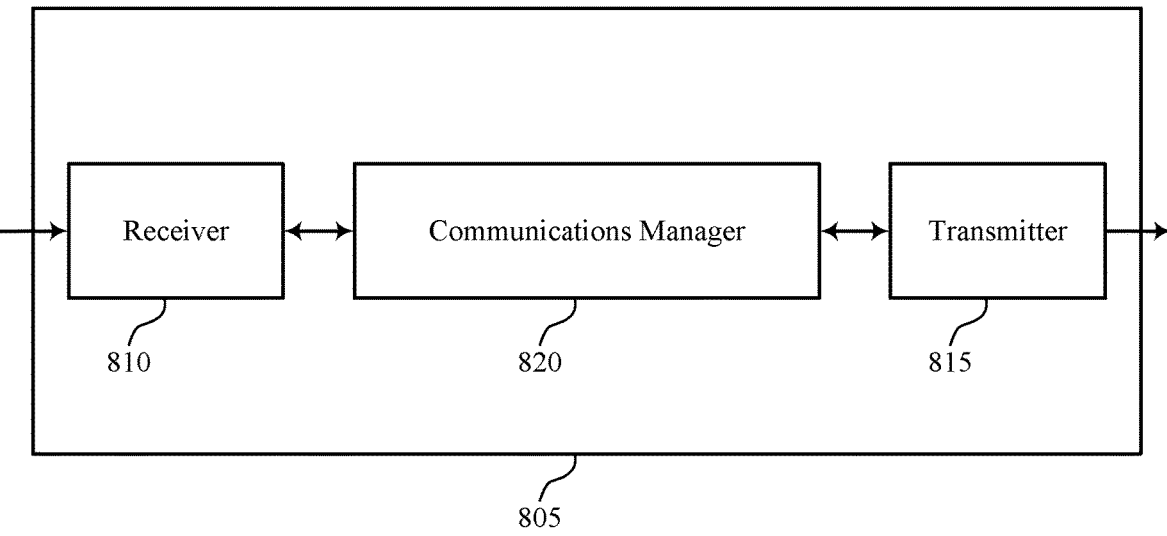
FIGS. 8 and 9 show block diagrams of devices that support full-duplex cell indication for full-duplex operation in accordance with aspects of the present disclosure.

FIG. 8 shows a block diagram 800 of a device 805 that supports full-duplex cell indication for full-duplex operation in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to full-duplex cell indication for full-duplex operation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to full-duplex cell indication for full-duplex operation). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of full-duplex cell indication for full-duplex operation as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving, from a base station, broadcast signaling indicating a communications mode capability associated with establishing a connection with the base station. The communications manager 820 may be configured as or otherwise support a means for establishing the connection with the base station based at least in part on the UE having the communications mode capability indicated in the broadcast signaling. The communications manager 820 may be configured as or otherwise support a means for communicating with the base station over the established connection.

Additionally, or alternatively, the communications manager 820 may support wireless communication at a UE in accordance with examples as disclosed herein. For example, the communications manager 820 may be configured as or otherwise support a means for receiving, from a base station, broadcast signaling indicating whether the base station operates in a full-duplex mode, a half-duplex mode, or both. The communications manager 820 may be configured as or otherwise support a means for establishing a connection with the base station based at least in part on whether the base station operates in the full-duplex mode, the half-duplex mode, or both. The communications manager 820 may be configured as or otherwise support a means for communicating with the base station over the established connection.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, more efficient utilization of communication resources, or both. In one aspect, because a base station may communicate exclusively with UEs having an indicated communications mode capability, configurations or control information received from the base station may be directed exclusively at the UEs having the communications mode capability. Thus, the UEs connected to the base station may avoid processing configurations or control information for UEs with different capabilities. In another aspect, because a base station may indicate an operating mode of the base station to UEs, the UEs may be able to perform cell selection more efficiently and connect to an appropriate cell for communications, resulting in more efficient utilization of communication resources.

Figure 9:
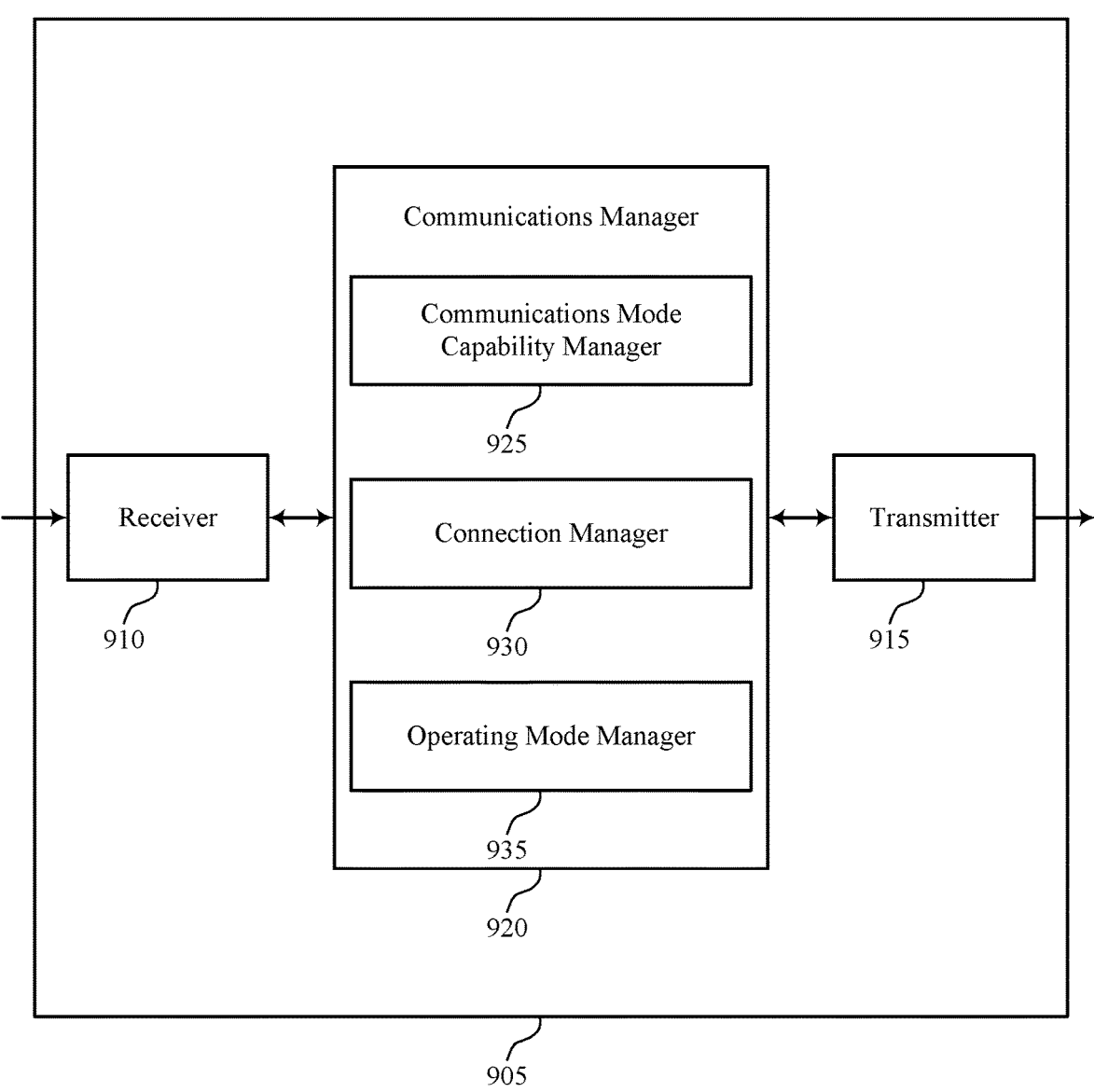

FIG. 9 shows a block diagram 900 of a device 905 that supports full-duplex cell indication for full-duplex operation in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to full-duplex cell indication for full-duplex operation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to full-duplex cell indication for full-duplex operation). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of full-duplex cell indication for full-duplex operation as described herein. For example, the communications manager 920 may include a communications mode capability manager 925, a connection manager 930, an operating mode manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The communications mode capability manager 925 may be configured as or otherwise support a means for receiving, from a base station, broadcast signaling indicating a communications mode capability associated with establishing a connection with the base station. The connection manager 930 may be configured as or otherwise support a means for establishing the connection with the base station based at least in part on the UE having the communications mode capability indicated in the broadcast signaling. The connection manager 930 may be configured as or otherwise support a means for communicating with the base station over the established connection.

Additionally, or alternatively, the communications manager 920 may support wireless communication at a UE in accordance with examples as disclosed herein. The operating mode manager 935 may be configured as or otherwise support a means for receiving, from a base station, broadcast signaling indicating whether the base station operates in a full-duplex mode, a half-duplex mode, or both. The connection manager 930 may be configured as or otherwise support a means for establishing a connection with the base station based at least in part on whether the base station operates in the full-duplex mode, the half-duplex mode, or both. The connection manager 930 may be configured as or otherwise support a means for communicating with the base station over the established connection.

Figure 10:
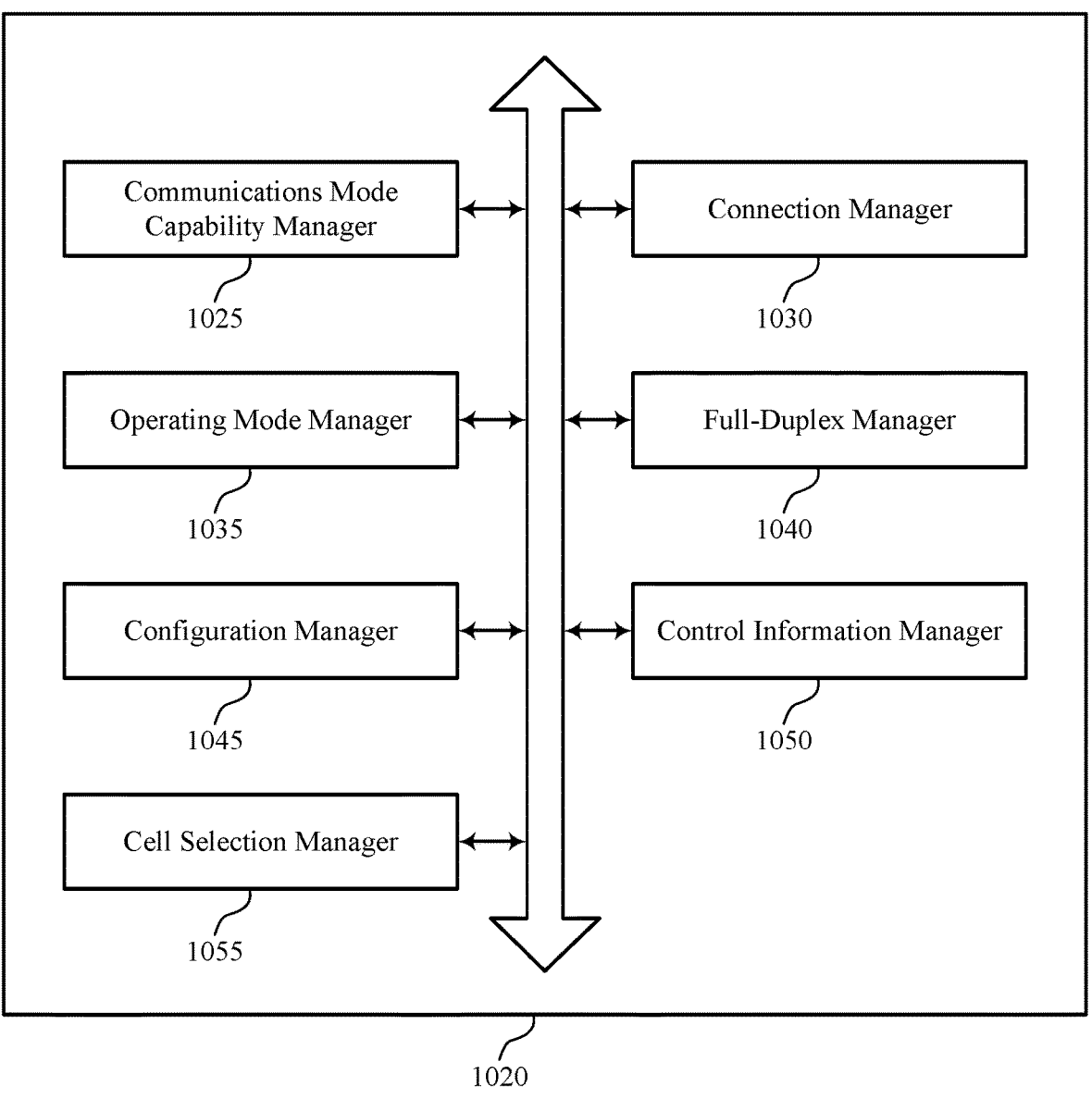
FIG. 10 shows a block diagram of a communications manager that supports full-duplex cell indication for full-duplex operation in accordance with aspects of the present disclosure.

FIG. 10 shows a block diagram 1000 of a communications manager 1020 that supports full-duplex cell indication for full-duplex operation in accordance with aspects of the present disclosure. The communications manager 1020 may be an example of aspects of a communications manager 820, a communications manager 920, or both, as described herein. The communications manager 1020, or various components thereof, may be an example of means for performing various aspects of full-duplex cell indication for full-duplex operation as described herein. For example, the communications manager 1020 may include a communications mode capability manager 1025, a connection manager 1030, an operating mode manager 1035, a full-duplex manager 1040, a configuration manager 1045, a control information manager 1050, a cell selection manager 1055, or any combination thereof. Each of these components may communicate, directly or indirectly, with one another (e.g., via one or more buses).

The communications manager 1020 may support wireless communication at a UE in accordance with examples as disclosed herein. The communications mode capability manager 1025 may be configured as or otherwise support a means for receiving, from a base station, broadcast signaling indicating a communications mode capability associated with establishing a connection with the base station. The connection manager 1030 may be configured as or otherwise support a means for establishing the connection with the base station based at least in part on the UE having the communications mode capability indicated in the broadcast signaling. In some examples, the connection manager 1030 may be configured as or otherwise support a means for communicating with the base station over the established connection.

In some examples, the communications mode capability manager 1025 may be configured as or otherwise support a means for identifying a default communications mode capability associated with establishing the connection with the base station in absence of the broadcast signaling indicating the communications mode capability.

In some examples, the default communications mode capability includes a half-duplex capability.

In some examples, the communications mode capability includes a full-duplex capability, and the full-duplex manager 1040 may be configured as or otherwise support a means for determining that the UE has the full-duplex capability, where establishing the connection with the base station is based at least in part on the UE having the full-duplex capability.

In some examples, the configuration manager 1045 may be configured as or otherwise support a means for receiving, from the base station, signaling indicating cell-specific configurations for communications with the base station based at least in part on the communications mode capability.

In some examples, the control information manager 1050 may be configured as or otherwise support a means for receiving, from the base station, one or more of semi-persistent scheduling information, control information, or random-access parameters based at least in part on the communications mode capability.

In some examples, the broadcast signaling includes system information.

Additionally, or alternatively, the communications manager 1020 may support wireless communication at a UE in accordance with examples as disclosed herein. The operating mode manager 1035 may be configured as or otherwise support a means for receiving, from a base station, broadcast signaling indicating whether the base station operates in a full-duplex mode, a half-duplex mode, or both. In some examples, the connection manager 1030 may be configured as or otherwise support a means for establishing a connection with the base station based at least in part on whether the base station operates in the full-duplex mode, the half-duplex mode, or both. In some examples, the connection manager 1030 may be configured as or otherwise support a means for communicating with the base station over the established connection.

In some examples, the cell selection manager 1055 may be configured as or otherwise support a means for selecting the base station with which to establish the connection based at least in part on whether the base station operates in the full-duplex mode, the half-duplex mode, or both.

In some examples, the broadcast signaling includes system information.

Figure 11:
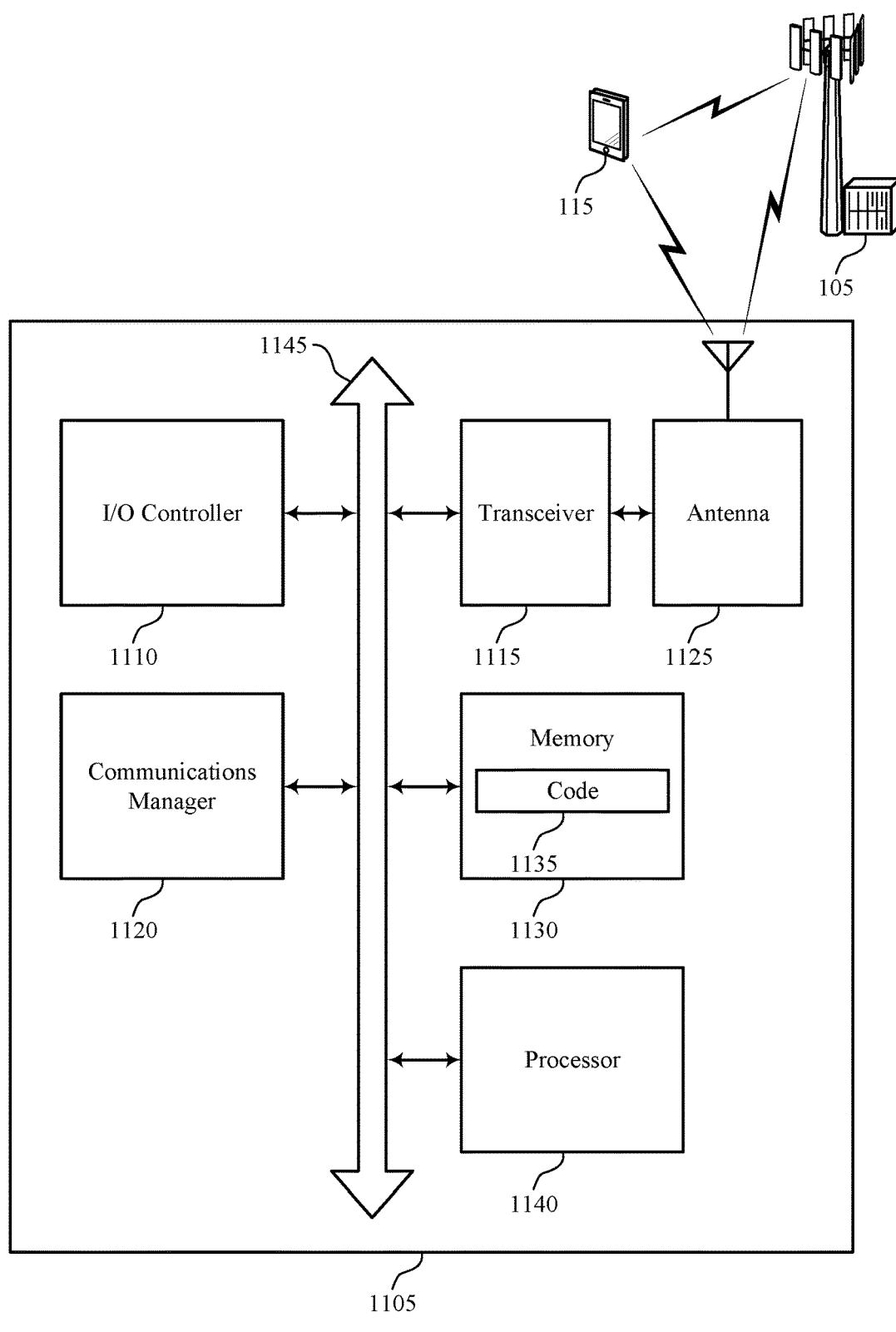
FIG. 11 shows a diagram of a system including a device that supports full-duplex cell indication for full-duplex operation in accordance with aspects of the present disclosure.

FIG. 11 shows a diagram of a system 1100 including a device 1105 that supports full-duplex cell indication for full-duplex operation in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOSED, ANDROID®, MS-DOS®, MS-WINDOWS®, OS/2®, UNIX®, LINUXED, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting full-duplex cell indication for full-duplex operation). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving, from a base station, broadcast signaling indicating a communications mode capability associated with establishing a connection with the base station. The communications manager 1120 may be configured as or otherwise support a means for establishing the connection with the base station based at least in part on the UE having the communications mode capability indicated in the broadcast signaling. The communications manager 1120 may be configured as or otherwise support a means for communicating with the base station over the established connection.

Additionally, or alternatively, the communications manager 1120 may support wireless communication at a UE in accordance with examples as disclosed herein. For example, the communications manager 1120 may be configured as or otherwise support a means for receiving, from a base station, broadcast signaling indicating whether the base station operates in a full-duplex mode, a half-duplex mode, or both. The communications manager 1120 may be configured as or otherwise support a means for establishing a connection with the base station based at least in part on whether the base station operates in the full-duplex mode, the half-duplex mode, or both. The communications manager 1120 may be configured as or otherwise support a means for communicating with the base station over the established connection.

By including or configuring the communications manager 1120 in accordance with examples as described herein, the device 1105 may support techniques for reduced processing, more efficient utilization of communication resources, or both. In one aspect, because a base station may communicate exclusively with UEs having an indicated communications mode capability, configurations or control information received from the base station may be directed exclusively at the UEs having the communications mode capability. Thus, the UEs connected to the base station may avoid processing configurations or control information for UEs with different capabilities. In another aspect, because a base station may indicate an operating mode of the base station to UEs, the UEs may be able to perform cell selection more efficiently and connect to an appropriate cell for communications, resulting in more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of full-duplex cell indication for full-duplex operation as described herein, or the processor 1140 and the memory 1130 may be otherwise configured to perform or support such operations.

Figure 12:
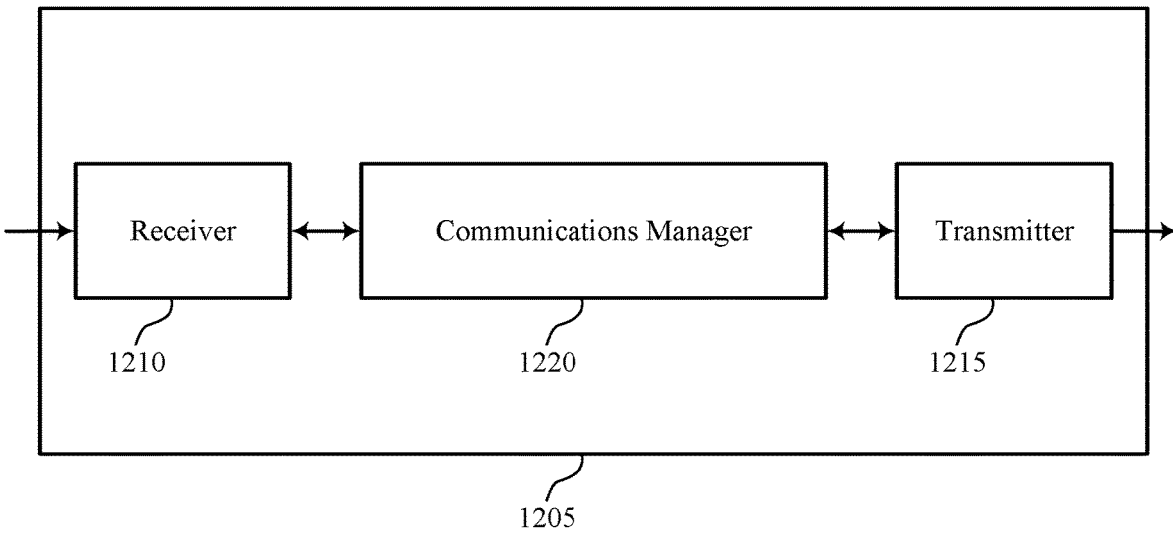
FIGS. 12 and 13 show block diagrams of devices that support full-duplex cell indication for full-duplex operation in accordance with aspects of the present disclosure.

FIG. 12 shows a block diagram 1200 of a device 1205 that supports full-duplex cell indication for full-duplex operation in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to full-duplex cell indication for full-duplex operation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to full-duplex cell indication for full-duplex operation). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of full-duplex cell indication for full-duplex operation as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting broadcast signaling indicating a communications mode capability associated with establishing a connection with the base station. The communications manager 1220 may be configured as or otherwise support a means for establishing the connection with a UE based at least in part on the UE having the communications mode capability indicated in the broadcast signaling. The communications manager 1220 may be configured as or otherwise support a means for communicating with the UE over the established connection.

Additionally, or alternatively, the communications manager 1220 may support wireless communication at a base station in accordance with examples as disclosed herein. For example, the communications manager 1220 may be configured as or otherwise support a means for transmitting broadcast signaling indicating whether the base station operates in a full-duplex mode, a half-duplex mode, or both. The communications manager 1220 may be configured as or otherwise support a means for establishing a connection with a UE based at least in part on transmitting the broadcast signaling indicating whether the base station operates in the full-duplex mode, the half-duplex mode, or both. The communications manager 1220 may be configured as or otherwise support a means for communicating with the UE over the established connection.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced processing, more efficient utilization of communication resources, or both. In one aspect, because a base station may communicate exclusively with UEs having a communications mode capability, the base station may avoid processing and providing configurations or control information for UEs with different capabilities, resulting in reduced processing at the base station. In another aspect, because the base station may indicate an operating mode of the base station to UEs, the UEs may be able to perform cell selection more efficiently and connect to an appropriate cell for communications, resulting in more efficient utilization of communication resources.

Figure 13:
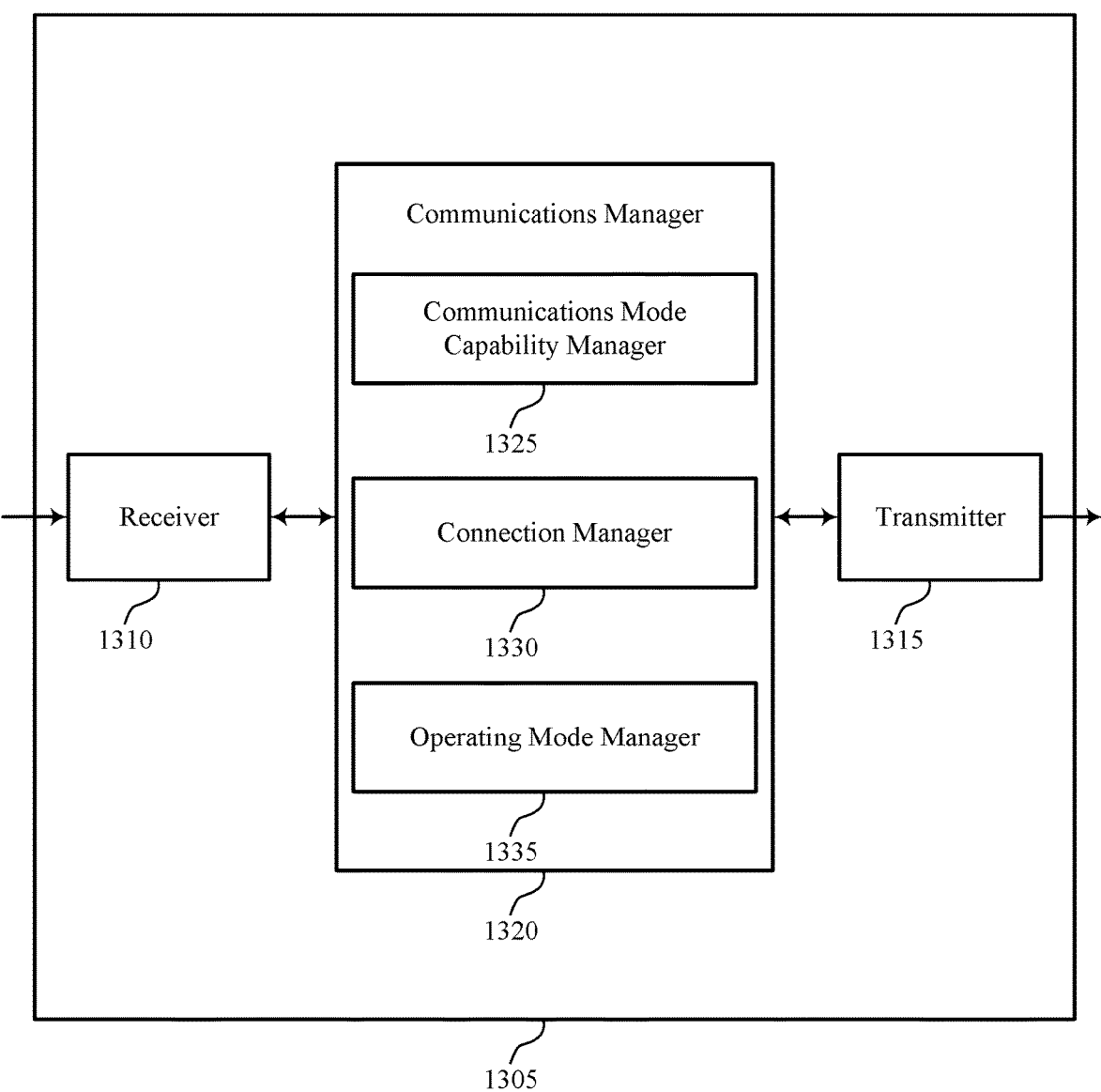

FIG. 13 shows a block diagram 1300 of a device 1305 that supports full-duplex cell indication for full-duplex operation in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to full-duplex cell indication for full-duplex operation). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to full-duplex cell indication for full-duplex operation). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of full-duplex cell indication for full-duplex operation as described herein. For example, the communications manager 1320 may include a communications mode capability manager 1325, a connection manager 1330, an operating mode manager 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The communications mode capability manager 1325 may be configured as or otherwise support a means for transmitting broadcast signaling indicating a communications mode capability associated with establishing a connection with the base station. The connection manager 1330 may be configured as or otherwise support a means for establishing the connection with a UE based at least in part on the UE having the communications mode capability indicated in the broadcast signaling. The connection manager 1330 may be configured as or otherwise support a means for communicating with the UE over the established connection.

Additionally, or alternatively, the communications manager 1320 may support wireless communication at a base station in accordance with examples as disclosed herein. The operating mode manager 1335 may be configured as or otherwise support a means for transmitting broadcast signaling indicating whether the base station operates in a full-duplex mode, a half-duplex mode, or both. The connection manager 1330 may be configured as or otherwise support a means for establishing a connection with a UE based at least in part on transmitting the broadcast signaling indicating whether the base station operates in the full-duplex mode, the half-duplex mode, or both. The connection manager 1330 may be configured as or otherwise support a means for communicating with the UE over the established connection.

Figure 14:
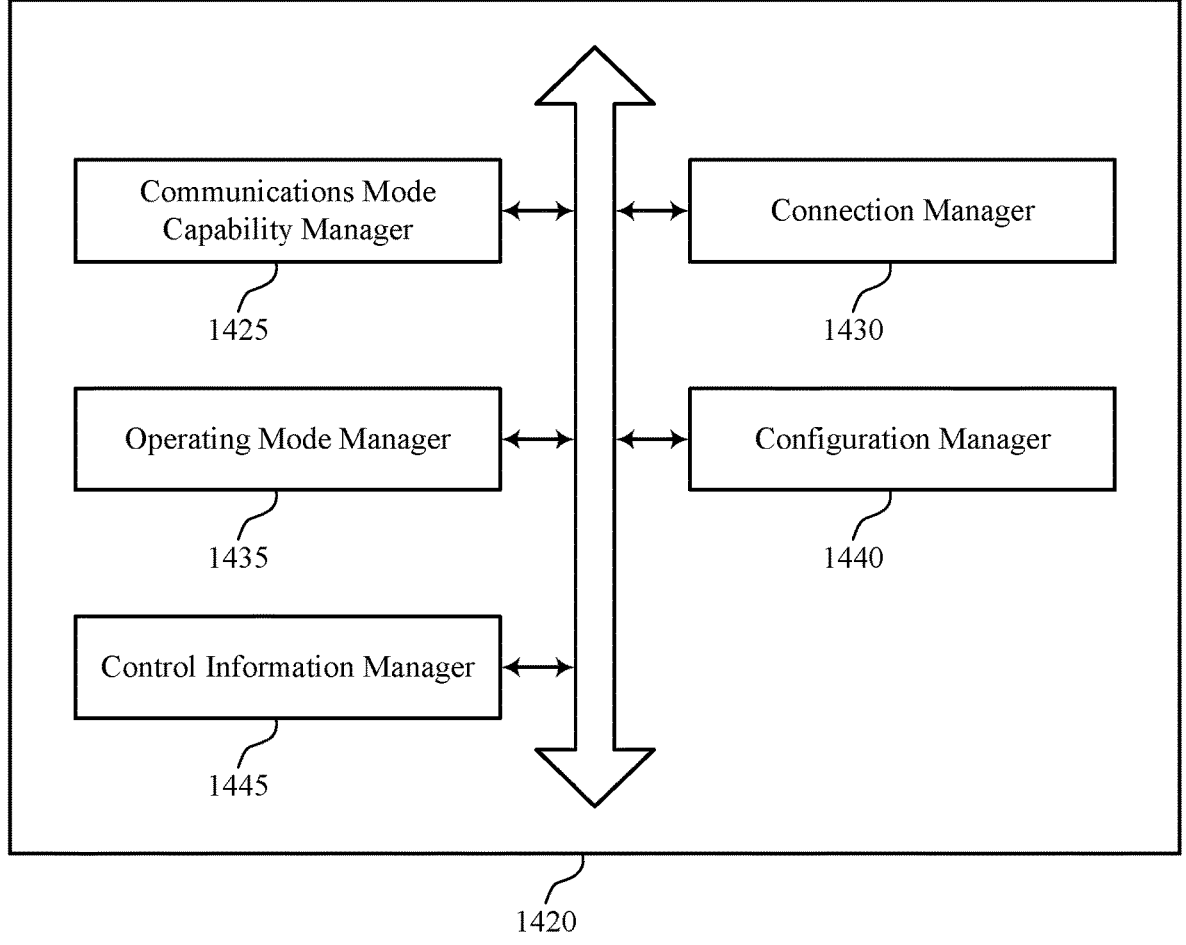
FIG. 14 shows a block diagram of a communications manager that supports full-duplex cell indication for full-duplex operation in accordance with aspects of the present disclosure.

FIG. 14 shows a block diagram 1400 of a communications manager 1420 that supports full-duplex cell indication for full-duplex operation in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of full-duplex cell indication for full-duplex operation as described herein. For example, the communications manager 1420 may include a communications mode capability manager 1425, a connection manager 1430, an operating mode manager 1435, a configuration manager 1440, a control information manager 1445, or any combination thereof. Each of these components may communicate, directly or indirectly, with one another (e.g., via one or more buses).

The communications manager 1420 may support wireless communication at a base station in accordance with examples as disclosed herein. The communications mode capability manager 1425 may be configured as or otherwise support a means for transmitting broadcast signaling indicating a communications mode capability associated with establishing a connection with the base station. The connection manager 1430 may be configured as or otherwise support a means for establishing the connection with a UE based at least in part on the UE having the communications mode capability indicated in the broadcast signaling. In some examples, the connection manager 1430 may be configured as or otherwise support a means for communicating with the UE over the established connection.

In some examples, the communications mode capability includes a full-duplex capability. In some examples, the UE has the full-duplex capability.

In some examples, the configuration manager 1440 may be configured as or otherwise support a means for transmitting signaling indicating cell-specific configurations for communications with the base station based at least in part on the communications mode capability.

In some examples, the control information manager 1445 may be configured as or otherwise support a means for transmitting one or more of semi-persistent scheduling information, control information, or random-access parameters based at least in part on the communications mode capability.

In some examples, the broadcast signaling includes system information.

In some examples, the base station is configured with a default communications mode capability associated with establishing the connection with the base station in absence of the broadcast signaling indicating the communications mode capability.

In some examples, the default communications mode capability includes a half-duplex capability.

Additionally, or alternatively, the communications manager 1420 may support wireless communication at a base station in accordance with examples as disclosed herein. The operating mode manager 1435 may be configured as or otherwise support a means for transmitting broadcast signaling indicating whether the base station operates in a full-duplex mode, a half-duplex mode, or both. In some examples, the connection manager 1430 may be configured as or otherwise support a means for establishing a connection with a UE based at least in part on transmitting the broadcast signaling indicating whether the base station operates in the full-duplex mode, the half-duplex mode, or both. In some examples, the connection manager 1430 may be configured as or otherwise support a means for communicating with the UE over the established connection.

In some examples, the broadcast signaling includes system information.

Figure 15:
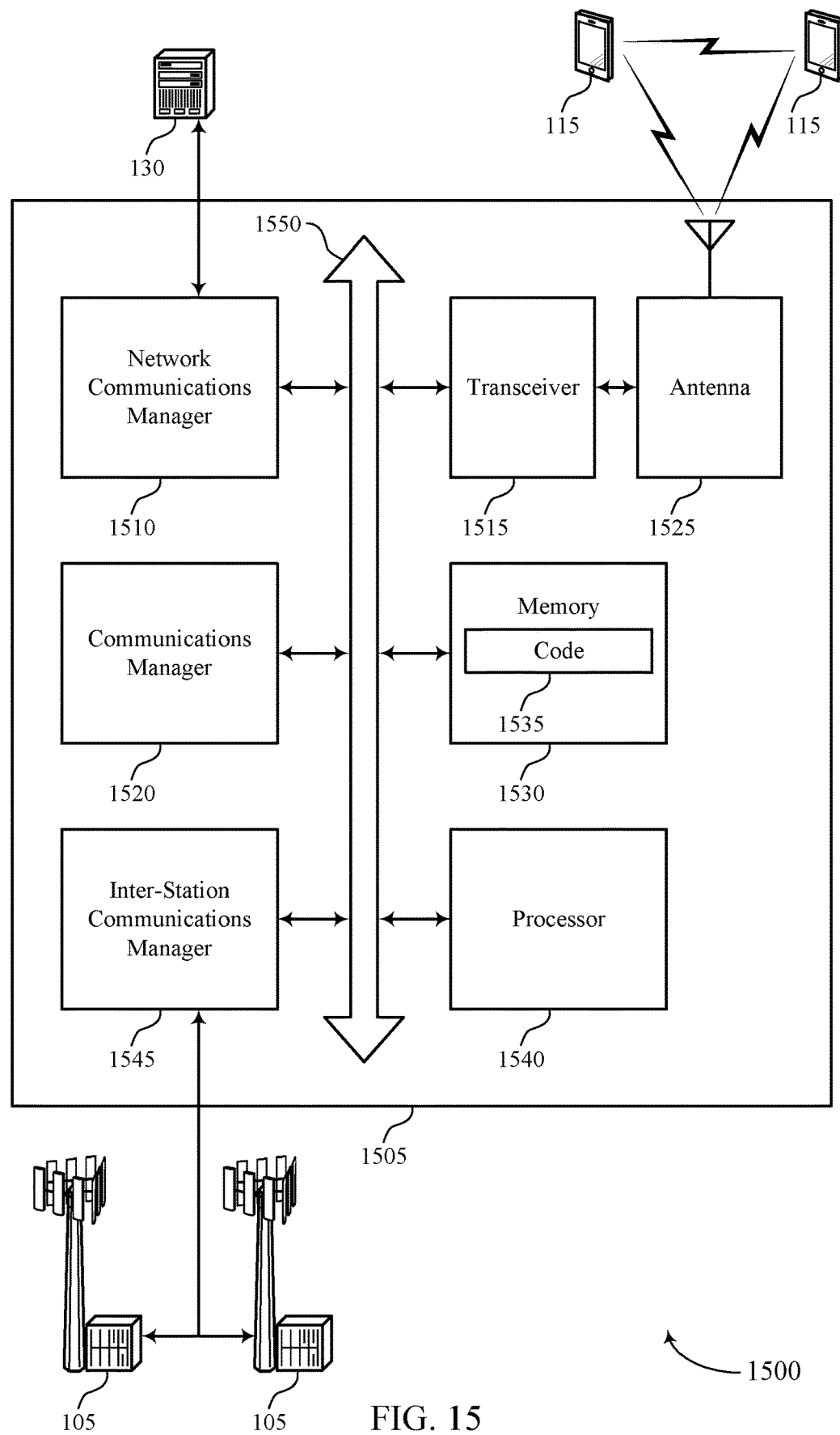
FIG. 15 shows a diagram of a system including a device that supports full-duplex cell indication for full-duplex operation in accordance with aspects of the present disclosure.

FIG. 15 shows a diagram of a system 1500 including a device 1505 that supports full-duplex cell indication for full-duplex operation in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting full-duplex cell indication for full-duplex operation). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for transmitting broadcast signaling indicating a communications mode capability associated with establishing a connection with the base station. The communications manager 1520 may be configured as or otherwise support a means for establishing the connection with a UE based at least in part on the UE having the communications mode capability indicated in the broadcast signaling. The communications manager 1520 may be configured as or otherwise support a means for communicating with the UE over the established connection.

Additionally, or alternatively, the communications manager 1520 may support wireless communication at a base station in accordance with examples as disclosed herein. For example, the communications manager 1520 may be configured as or otherwise support a means for transmitting broadcast signaling indicating whether the base station operates in a full-duplex mode, a half-duplex mode, or both. The communications manager 1520 may be configured as or otherwise support a means for establishing a connection with a UE based at least in part on transmitting the broadcast signaling indicating whether the base station operates in the full-duplex mode, the half-duplex mode, or both. The communications manager 1520 may be configured as or otherwise support a means for communicating with the UE over the established connection.

By including or configuring the communications manager 1520 in accordance with examples as described herein, the device 1505 may support techniques for reduced processing, more efficient utilization of communication resources, or both. In one aspect, because a base station may communicate exclusively with UEs having a communications mode capability, the base station may avoid processing and providing configurations or control information for UEs with different capabilities, resulting in reduced processing at the base station. In another aspect, because the base station may indicate an operating mode of the base station to UEs, the UEs may be able to perform cell selection more efficiently and connect to an appropriate cell for communications, resulting in more efficient utilization of communication resources.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor

1540, the memory 1530, the code 1535, or any combination thereof. For example, the code 1535 may include instructions executable by the processor 1540 to cause the device 1505 to perform various aspects of full-duplex cell indication for full-duplex operation as described herein, or the processor 1540 and the memory 1530 may be otherwise configured to perform or support such operations.

FIG. 16 shows a flowchart illustrating a method 1600 that supports full-duplex cell indication for full-duplex operation in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station, broadcast signaling indicating a communications mode capability associated with establishing a connection with the base station. The operations of 1605 may be performed in accordance with examples as disclosed herein. In some examples, aspects of the operations of 1605 may be performed by a communications mode capability manager 1025 as described with reference to FIG. 10.

At 1610, the method may include establishing the connection with the base station based at least in part on the UE having the communications mode capability indicated in the broadcast signaling. The operations of 1610 may be performed in accordance with examples as disclosed herein. In some examples, aspects of the operations of 1610 may be performed by a connection manager 1030 as described with reference to FIG. 10.

At 1615, the method may include communicating with the base station over the established connection. The operations of 1615 may be performed in accordance with examples as disclosed herein. In some examples, aspects of the operations of 1615 may be performed by a connection manager 1030 as described with reference to FIG. 10.

Figure 17:
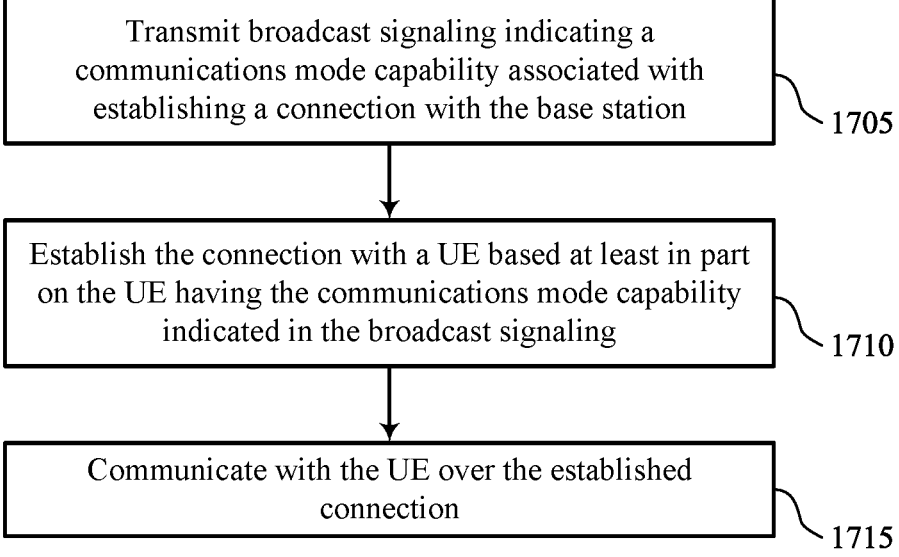

FIG. 17 shows a flowchart illustrating a method 1700 that supports full-duplex cell indication for full-duplex operation in accordance with aspects of the present disclosure. The operations of the method 1700 may be implemented by a base station or its components as described herein. For example, the operations of the method 1700 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1705, the method may include transmitting broadcast signaling indicating a communications mode capability associated with establishing a connection with the base station. The operations of 1705 may be performed in accordance with examples as disclosed herein. In some examples, aspects of the operations of 1705 may be performed by a communications mode capability manager 1425 as described with reference to FIG. 14.

At 1710, the method may include establishing the connection with a UE based at least in part on the UE having the communications mode capability indicated in the broadcast signaling. The operations of 1710 may be performed in accordance with examples as disclosed herein. In some examples, aspects of the operations of 1710 may be performed by a connection manager 1430 as described with reference to FIG. 14.

At 1715, the method may include communicating with the UE over the established connection. The operations of 1715 may be performed in accordance with examples as disclosed herein. In some examples, aspects of the operations of 1715 may be performed by a connection manager 1430 as described with reference to FIG. 14.

FIG. 18 shows a flowchart illustrating a method 1800 that supports full-duplex cell indication for full-duplex operation in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving, from a base station, broadcast signaling indicating whether the base station operates in a full-duplex mode, a half-duplex mode, or both. The operations of 1805 may be performed in accordance with examples as disclosed herein. In some examples, aspects of the operations of 1805 may be performed by an operating mode manager 1035 as described with reference to FIG. 10.

At 1810, the method may include establishing a connection with the base station based at least in part on whether the base station operates in the full-duplex mode, the half-duplex mode, or both. The operations of 1810 may be performed in accordance with examples as disclosed herein. In some examples, aspects of the operations of 1810 may be performed by a connection manager 1030 as described with reference to FIG. 10.

At 1815, the method may include communicating with the base station over the established connection. The operations of 1815 may be performed in accordance with examples as disclosed herein. In some examples, aspects of the operations of 1815 may be performed by a connection manager 1030 as described with reference to FIG. 10.

FIG. 19 shows a flowchart illustrating a method 1900 that supports full-duplex cell indication for full-duplex operation in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1905, the method may include transmitting broadcast signaling indicating whether the base station operates in a full-duplex mode, a half-duplex mode, or both. The operations of 1905 may be performed in accordance with examples as disclosed herein. In some examples, aspects of the operations of 1905 may be performed by an operating mode manager 1435 as described with reference to FIG. 14.

At 1910, the method may include establishing a connection with a UE based at least in part on transmitting the broadcast signaling indicating whether the base station operates in the full-duplex mode, the half-duplex mode, or both.

The operations of 1910 may be performed in accordance with examples as disclosed herein. In some examples, aspects of the operations of 1910 may be performed by a connection manager 1430 as described with reference to FIG. 14.

At 1915, the method may include communicating with the UE over the established connection. The operations of 1915 may be performed in accordance with examples as disclosed herein. In some examples, aspects of the operations of 1915 may be performed by a connection manager 1430 as described with reference to FIG. 14.

The following provides an overview of aspects of the present disclosure:

Aspect 1: A method for wireless communication at a UE, comprising: receiving, from a base station, broadcast signaling indicating a communications mode capability associated with establishing a connection with the base station; establishing the connection with the base station based at least in part on the UE having the communications mode capability indicated in the broadcast signaling; and communicating with the base station over the established connection.

Aspect 2: The method of aspect 1, further comprising: identifying a default communications mode capability associated with establishing the connection with the base station in absence of the broadcast signaling indicating the communications mode capability.

Aspect 3: The method of aspect 2, wherein the default communications mode capability comprises a half-duplex capability.

Aspect 4: The method of any of aspects 1 through 3, wherein the communications mode capability comprises a full-duplex capability, the method further comprising: determining that the UE has the full-duplex capability, wherein establishing the connection with the base station is based at least in part on the UE having the full-duplex capability.

Aspect 5: The method of any of aspects 1 through 4, further comprising: receiving, from the base station, signaling indicating cell-specific configurations for communications with the base station based at least in part on the communications mode capability.

Aspect 6: The method of any of aspects 1 through 5, further comprising: receiving, from the base station, one or more of semi-persistent scheduling information, control information, or random-access parameters based at least in part on the communications mode capability.

Aspect 7: The method of any of aspects 1 through 6, wherein the broadcast signaling comprises system information.

Aspect 8: A method for wireless communication at a base station, comprising: transmitting broadcast signaling indicating a communications mode capability associated with establishing a connection with the base station; establishing the connection with a UE based at least in part on the UE having the communications mode capability indicated in the broadcast signaling; and communicating with the UE over the established connection.

Aspect 9: The method of aspect 8, wherein the communications mode capability comprises a full-duplex capability, and the UE has the full-duplex capability.

Aspect 10: The method of any of aspects 8 through 9, further comprising: transmitting signaling indicating cell-specific configurations for communications with the base station based at least in part on the communications mode capability.

Aspect 11: The method of any of aspects 8 through 10, further comprising: transmitting one or more of semi-persistent scheduling information, control information, or random-access parameters based at least in part on the communications mode capability.

Aspect 12: The method of any of aspects 8 through 11, wherein the broadcast signaling comprises system information.

Aspect 13: The method of any of aspects 8 through 12, wherein the base station is configured with a default communications mode capability associated with establishing the connection with the base station in absence of the broadcast signaling indicating the communications mode capability.

Aspect 14: The method of aspect 13, wherein the default communications mode capability comprises a half-duplex capability.

Aspect 15: A method for wireless communication at a UE, comprising: receiving, from a base station, broadcast signaling indicating whether the base station operates in a full-duplex mode, a half-duplex mode, or both; establishing a connection with the base station based at least in part on whether the base station operates in the full-duplex mode, the half-duplex mode, or both; and communicating with the base station over the established connection.

Aspect 16: The method of aspect 15, further comprising: selecting the base station with which to establish the connection based at least in part on whether the base station operates in the full-duplex mode, the half-duplex mode, or both.

Aspect 17: The method of any of aspects 15 through 16, wherein the broadcast signaling comprises system information.

Aspect 18: A method for wireless communication at a base station, comprising: transmitting broadcast signaling indicating whether the base station operates in a full-duplex mode, a half-duplex mode, or both; establishing a connection with a UE based at least in part on transmitting the broadcast signaling indicating whether the base station operates in the full-duplex mode, the half-duplex mode, or both; and communicating with the UE over the established connection.

Aspect 19: The method of aspect 18, wherein the broadcast signaling comprises system information.

Aspect 20: An apparatus for wireless communication at a UE, comprising a processor; memory coupled with the processor; and instructions stored in the memory and executable by the processor to cause the apparatus to perform a method of any of aspects 1 through 7.

Aspect 21: An apparatus for wireless communication at a UE, comprising at least one means for performing a method of any of aspects 1 through 7.

Aspect 22: A non-transitory computer-readable medium storing code for wireless communication at a UE, the code comprising instructions executable by a processor to perform a method of any of aspects 1 through 7.

Aspect 23: An apparatus for wireless communication at a base station, comprising a processor; memory coupled with the processor; and instructions stored in the memory and executable by the processor to cause the apparatus to perform a method of any of aspects 8 through 14.

Aspect 24: An apparatus for wireless communication at a base station, comprising at least one means for performing a method of any of aspects 8 through 14.

Aspect 25: A non-transitory computer-readable medium storing code for wireless communication at a base station, the code comprising instructions executable by a processor to perform a method of any of aspects 8 through 14.

Aspect 26: An apparatus for wireless communication at a UE, comprising a processor; memory coupled with the processor; and instructions stored in the memory and executable by the processor to cause the apparatus to perform a method of any of aspects 15 through 17.

Aspect 27: An apparatus for wireless communication at a UE, comprising at least one means for performing a method of any of aspects 15 through 17.

Aspect 28: A non-transitory computer-readable medium storing code for wireless communication at a UE, the code comprising instructions executable by a processor to perform a method of any of aspects 15 through 17.

Aspect 29: An apparatus for wireless communication at a base station, comprising a processor; memory coupled with the processor; and instructions stored in the memory and executable by the processor to cause the apparatus to perform a method of any of aspects 18 through 19.

Aspect 30: An apparatus for wireless communication at a base station, comprising at least one means for performing a method of any of aspects 18 through 19.

Aspect 31: A non-transitory computer-readable medium storing code for wireless communication at a base station, the code comprising instructions executable by a processor to perform a method of any of aspects 18 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a network device, broadcast signaling that includes a bit indicating a duplexing mode capability associated with establishing a connection with the network device, the duplexing mode capability comprising a full-duplex capability, a half-duplex capability, or both;

establishing the connection with the network device based at least in part on a selection between the network device and a second network device, the connection being established with the network device based at least in part on the UE having a corresponding duplexing mode capability that is the same as the duplexing mode capability of the network device indicated by the broadcast signaling, wherein the bit indicating the duplexing mode capability indicates establishing of connectivity with the network device is barred for any UE having a duplexing mode capability that is different from the duplexing mode capability of the network device; and communicating with the network device via the established connection.

2. The method of claim 1, further comprising:

identifying a default duplexing mode capability associated with establishing the connection with the network device in absence of the broadcast signaling indicating the duplexing mode capability.

3. The method of claim 2, wherein the default duplexing mode capability comprises the half-duplex capability.

4. The method of claim 1, wherein the duplexing mode capability comprises the full-duplex capability, the method further comprising:

determining that the UE has the full-duplex capability, wherein establishing the connection with the network device is based at least in part on the UE having the full-duplex capability.

5. The method of claim 1, wherein establishing the connection with the network device comprises:

establishing the connection with the network device based at least in part on whether the UE has the half-duplex capability, the full-duplex capability, or both.

6. The method of claim 1, further comprising:

receiving, from the network device, signaling indicating cell-specific configurations for communications with the network device based at least in part on the duplexing mode capability.

7. The method of claim 1, further comprising:

receiving, from the network device, one or more of semi-persistent scheduling information, control information, or random-access parameters based at least in part on the duplexing mode capability.

8. The method of claim 1, wherein the broadcast signaling comprises system information.

9. The method of claim 1, wherein the bit comprises a single bit indicator indicating the duplexing mode capability.

10. A method for wireless communication at a network device, comprising:

transmitting broadcast signaling that includes a bit indicating a duplexing mode capability associated with establishing a connection with the network device, the duplexing mode capability comprising a full-duplex capability, a half-duplex capability, or both, wherein the bit indicating the duplexing mode capability indicates establishing of connectivity with the network device is barred for any user equipment (UE) having a duplexing mode capability that is different from the duplexing mode capability of the network device;

establishing the connection with a UE based at least in part on a selection between the network device and a second network device, the connection being established with the UE and the network device based at least in part on the UE having a corresponding duplexing mode capability that is the same as the duplexing mode capability of the network device indicated by the broadcast signaling; and communicating with the UE via the established connection.

11. The method of claim 10, wherein the duplexing mode capability comprises the full-duplex capability, and the UE has the full-duplex capability.

12. The method of claim 10, wherein the duplexing mode capability comprises the half-duplex capability, and wherein the UE has the half-duplex capability.

13. The method of claim 10, wherein the UE has the half-duplex capability, the full-duplex capability, or both.

14. The method of claim 10, further comprising:

transmitting signaling indicating cell-specific configurations for communications with the network device based at least in part on the duplexing mode capability.

15. The method of claim 10, further comprising:

transmitting one or more of semi-persistent scheduling information, control information, or random-access parameters based at least in part on the duplexing mode capability.

16. The method of claim 10, wherein the broadcast signaling comprises system information.

17. The method of claim 10, wherein the bit comprises a single bit indicator indicating the duplexing mode capability.

18. The method of claim 10, wherein the network device is configured with a default duplexing mode capability associated with establishing the connection with the network device in absence of the broadcast signaling indicating the duplexing mode capability.

19. The method of claim 18, wherein the default duplexing mode capability comprises the half-duplex capability.

20. A method for wireless communication at a user equipment (UE), comprising:

receiving, from a network device, broadcast signaling that includes a bit indicating whether the network device operates in a full-duplex mode, a half-duplex mode, or both, in accordance with a duplexing mode capability of the network device;

establishing a connection with the network device based at least in part on a selection between the network device and a second network device, the connection being established with the network device based at least in part on the network device operating in the full-duplex mode, the half-duplex mode, or both and the UE operating in a same corresponding full-duplex mode, a corresponding half-duplex mode, or both, in accordance with a corresponding duplexing mode capability of the UE, wherein the bit indicates establishing of connectivity with the network device is barred for any UE having a duplexing mode capability that is different from the duplexing mode capability of the network device; and communicating with the network device via the established connection.

21. The method of claim 20, wherein the network device operates in the full-duplex mode, the method further comprising:

determining that the UE has a full-duplex capability, a half-duplex capability, or both, wherein establishing the connection with the network device is based at least in part on the UE having the full-duplex capability, the half-duplex capability, or both.

22. The method of claim 20, further comprising:

selecting the network device with which to establish the connection based at least in part on whether the network device operates in the full-duplex mode, the half-duplex mode, or both.

23. The method of claim 20, wherein the broadcast signaling comprises system information.

24. The method of claim 20, wherein the bit comprises a single bit indicator which indicates whether the network device operates in the full-duplex mode, the half-duplex mode, or both.

25. A method for wireless communication at a network device, comprising:

transmitting broadcast signaling that includes a bit indicating whether the network device operates in a full-duplex mode, a half-duplex mode, or both, in accordance with a duplexing mode capability of the network device, wherein the bit indicates establishing of a connectivity with the network device is barred for any user equipment (UE) having a duplexing mode capability that is different from the duplexing mode capability of the network device;

establishing a connection with a UE based at least in part on transmitting the broadcast signaling indicating whether the network device operates in the full-duplex mode, the half-duplex mode, or both, and based at least in part on a selection between the network device and a second network device, the connection being established with the UE and the network device based at least in part on the UE operating in a same corresponding full-duplex mode, a corresponding half-duplex mode, or both, in accordance with a corresponding duplexing mode capability of the UE; and communicating with the UE via the established connection.

26. The method of claim 25, wherein the network device operates in the full-duplex mode, and the UE has a full-duplex capability.

27. The method of claim 25, wherein the network device operates in the half-duplex mode, and the UE has a half-duplex capability.

28. The method of claim 25, wherein the network device operates in the full-duplex mode and the half-duplex mode, and the UE has a half-duplex capability, a full-duplex capability, or both.

29. The method of claim 25, wherein the broadcast signaling comprises system information.

30. The method of claim 25, wherein the bit comprises a single bit indicator which indicates whether the network device operates in the full-duplex mode, the half-duplex mode, or both.

\* \* \* \* \*